United States Patent
Lorenz et al.

(10) Patent No.: US 11,975,606 B2
(45) Date of Patent: May 7, 2024

(54) DRIVE AXLE SYSTEM HAVING MULTIPLE ELECTRIC MOTORS

(71) Applicant: ArvinMeritor Technology, LLC, Troy, MI (US)

(72) Inventors: Edwin D. Lorenz, Grand Blanc, MI (US); Adam P. Sadlik, Clarkston, MI (US); Michael Schlundt, Royal Oak, MI (US); Rituja D. Marathe, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/833,462

(22) Filed: Jun. 6, 2022

(65) Prior Publication Data

US 2022/0297538 A1    Sep. 22, 2022

Related U.S. Application Data

(62) Division of application No. 16/826,866, filed on Mar. 23, 2020, now Pat. No. 11,407,307.

(51) Int. Cl.
| | |
|---|---|
| *B60K 23/04* | (2006.01) |
| *B60K 1/02* | (2006.01) |
| *B60K 17/02* | (2006.01) |
| *B60K 17/16* | (2006.01) |
| *B60K 23/08* | (2006.01) |
| *F16H 48/36* | (2012.01) |

(52) U.S. Cl.
CPC ............... *B60K 23/04* (2013.01); *B60K 1/02* (2013.01); *B60K 17/02* (2013.01); *B60K 17/16* (2013.01); *F16H 48/36* (2013.01); *F16H 2048/364* (2013.01)

(58) Field of Classification Search
CPC .......... B60K 23/04; B60K 1/02; B60K 17/02; B60K 17/16; F16H 48/36; F16H 2048/364; B60Y 220/91
See application file for complete search history.

(56) References Cited

U.S. PATENT DOCUMENTS

| | | | |
|---|---|---|---|
| 6,615,946 B2 | 9/2003 | Pasquini | |
| 6,708,788 B2 | 3/2004 | Kuwayama | |
| 6,880,664 B2 * | 4/2005 | Pecnik | B60K 6/387 |
| | | | 903/910 |

(Continued)

FOREIGN PATENT DOCUMENTS

| | | |
|---|---|---|
| CN | 206589652 U | 10/2017 |
| CN | 107420516 A | 12/2017 |

(Continued)

OTHER PUBLICATIONS

Partial European Search Report dated Jul. 20, 2021 for related European Application No. 21152713.0; 26 pages.

(Continued)

*Primary Examiner* — Tinh Dang
(74) *Attorney, Agent, or Firm* — Brooks Kushman PC

(57) ABSTRACT

A drive axle system having at least one differential assembly, a first electric motor, and a second electric motor. The first electric motor and the second electric motor may be selectively connectable to the differential assembly. The first electric motor, the second electric motor, or both may provide torque to the differential assembly.

20 Claims, 16 Drawing Sheets

(56) References Cited

U.S. PATENT DOCUMENTS

| | | | |
|---|---|---|---|
| 7,140,461 B2 * | 11/2006 | Morrow ................. | B60K 6/445 |
| | | | 180/65.245 |
| 7,315,774 B2 * | 1/2008 | Morris ................. | B60W 10/06 |
| | | | 701/87 |
| 8,590,648 B2 * | 11/2013 | Poschmann ............ | B60K 6/547 |
| | | | 180/65.23 |
| 9,096,126 B2 | 8/2015 | Knoblauch | |
| 9,566,852 B2 | 2/2017 | Knoblauch et al. | |
| 10,343,507 B2 * | 7/2019 | Perkins ................ | B60K 17/356 |
| 10,723,224 B2 * | 7/2020 | Misu ....................... | F16H 3/728 |
| 11,192,434 B2 | 12/2021 | Hummel | |
| 2002/0074177 A1 | 6/2002 | Pasquini et al. | |
| 2005/0023885 A1 | 2/2005 | Bennett | |
| 2005/0124450 A1 | 6/2005 | Gady et al. | |
| 2007/0225889 A1 | 9/2007 | Morris | |
| 2014/0284130 A1 | 9/2014 | Knoblauch | |
| 2014/0332301 A1 | 11/2014 | Knoblauch et al. | |
| 2014/0335999 A1 | 11/2014 | Knoblauch | |
| 2015/0021109 A1 | 1/2015 | Knoblauch et al. | |
| 2015/0306955 A1 | 10/2015 | Knoblauch | |
| 2017/0159780 A1 | 6/2017 | Trost | |
| 2018/0201321 A1 * | 7/2018 | Polden ................... | B60K 17/22 |
| 2019/0293158 A1 | 9/2019 | Brown | |

FOREIGN PATENT DOCUMENTS

| | | | |
|---|---|---|---|
| DE | 102010015437 A1 | | 11/2011 |
| DE | 102016100788 A1 | * | 7/2017 |
| EP | 2116412 A2 | | 11/2009 |
| EP | 3623193 A1 | | 3/2020 |
| WO | 2008077346 A1 | | 7/2008 |
| WO | 2011131520 A1 | | 10/2011 |

OTHER PUBLICATIONS

Extended European Search Report dated Dec. 10, 2021 for related European Application No. 21152713.0.
India First Examination Report dated Dec. 29, 2021 for related India Application No. 202014056659; 6 Pages.
Chinese Office Action dated Aug. 15, 2023 for related Chinese Appln. No. 202011612426.4; 9 Pages.
Partial search report dated Feb. 21, 2024 for related European Appln. No. 23206635.7; 14 Pages.

* cited by examiner

DRIVE AXLE SYSTEM HAVING MULTIPLE ELECTRIC MOTORS

CROSS-REFERENCE TO RELATED APPLICATIONS

This application is a division of U.S. application Ser. No. 16/826,866, filed Mar. 23, 2020, the disclosure of which is hereby incorporated in its entirety by reference herein.

TECHNICAL FIELD

This document relates to a drive axle system that may have multiple electric motors. The electric motors may be operatively connectable to a differential assembly.

BACKGROUND

A drive system having first and second drive motors is disclosed in U.S. Patent Publication No. 2005/0124450.

SUMMARY

In at least one embodiment, a drive axle system is provided. The drive axle system may include a differential assembly, a drive pinion, a first electric motor, and a second electric motor. The differential assembly may have a ring gear and may be rotatable about a first axis. The drive pinion may mesh with the ring gear and may be rotatable about a second axis. The first electric motor may be selectively connectable to the drive pinion via a first gear set. The second electric motor may be selectively connectable to the drive pinion via a second gear set. The first gear set may be spaced apart from the second gear set. The first gear set may have a different gear ratio than the second gear set.

In at least one embodiment, a drive axle system is provided. The drive axle system may include a differential assembly, a drive pinion, a first electric motor, and a second electric motor. The differential assembly may have a ring gear and may be rotatable about a first axis. The drive pinion may mesh with the ring gear and may be rotatable about a second axis. The first electric motor may be selectively connectable to the drive pinion via a gear set. The second electric motor may be selectively connectable to the drive pinion via the gear set. The first electric motor and the second electric motor may be rotatable about a motor axis.

In at least one embodiment, a drive axle system is provided. The drive axle system may include a first differential assembly, a second differential assembly, a first electric motor, a second electric motor, and a clutch. The first differential assembly may be rotatable about a first differential axis. The second differential assembly may be rotatable about a second differential axis that may differ from the first differential axis. The first electric motor may be operatively connectable to the first differential assembly. The second electric motor may be operatively connectable to the second differential assembly. The first electric motor and the second electric motor may be operatively connectable in series with the clutch.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
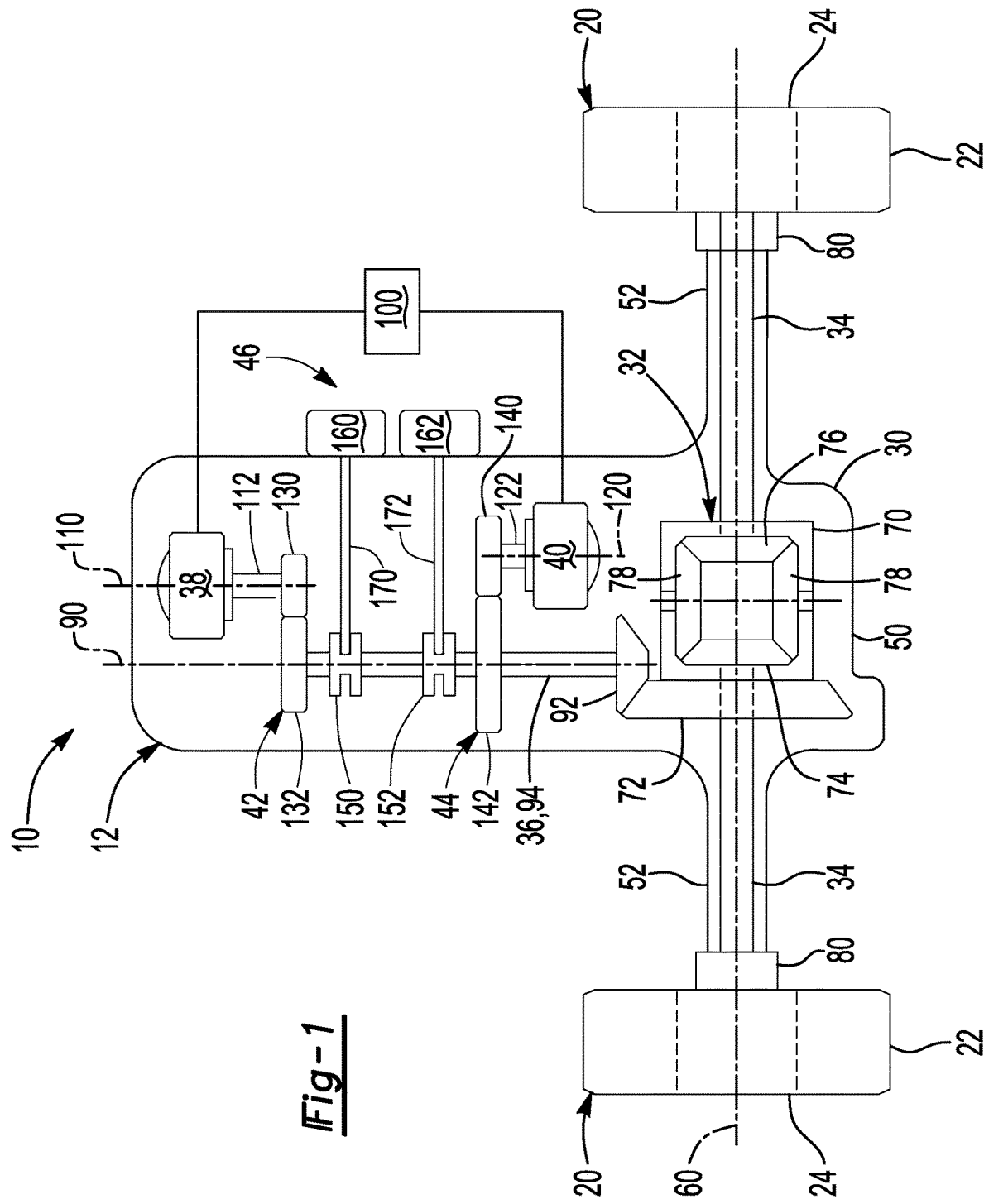
FIG. 1 depicts an example of a drive axle system with a first clutch in a first position and a second clutch in a first position.

Referring to FIG. 1, an example of a drive axle system 10 is shown. The drive axle system 10 may be provided with a motor vehicle like a car, truck, bus, farm equipment, mining equipment, military transport or weaponry vehicle, or cargo loading equipment for land, air, or marine vessels. The motor vehicle may include a trailer for transporting cargo in one or more embodiments.

The drive axle system 10 may include one or more axle assemblies 12. An axle assembly 12 may provide torque to one or more wheel assemblies 20 that may be rotatably supported on the axle assembly 12. A wheel assembly 20 may include a tire 22 that may be disposed on a wheel 24. A wheel assembly 20 may receive torque from at least one electric motor as will be discussed in more detail below. In at least one configuration, the axle assembly 12 may include a housing assembly 30, a differential assembly 32, at least one axle shaft 34, a drive pinion 36, a first electric motor 38, a second electric motor 40, a first gear set 42, a second gear set 44, and a control system 46.

The housing assembly 30 may facilitate mounting of the axle assembly 12 to the vehicle. In addition, the housing assembly 30 may receive and/or support components of the axle assembly 12. For example, the housing assembly 30 may support the differential assembly 32, axle shafts 34, drive pinion 36, first electric motor 38, second electric motor 40, first gear set 42, second gear set 44, or combinations thereof. In at least one configuration, the housing assembly 30 may include an axle housing that may have a center portion 50 and one or more arm portions 52.

The center portion 50 may be disposed proximate the center of the housing assembly 30. The center portion 50 may at least partially define a cavity that may receive the differential assembly 32. The center portion 50 may be made of one or more components and may facilitate mounting of a differential carrier that supports the differential assembly 32. A lower region of the center portion 50 may at least partially define a sump portion that may contain lubricant that may be splashed to lubricate internal components of the axle assembly 12, such as the differential assembly 32 and associated bearings.

One or more arm portions 52 may extend from the center portion 50. For example, two arm portions 52 may extend in opposite directions from the center portion 50 and away from the differential assembly 32. The arm portions 52 may have similar configurations. For example, the arm portions 52 may each have a hollow configuration or tubular configuration that may extend around a corresponding axle shaft 34 and may help separate or isolate the axle shaft 34 from the surrounding environment. It is also contemplated that the arm portions 52 may be omitted.

The differential assembly 32 may be at least partially received in the center portion 50 of the housing assembly 30. The differential assembly 32 may transmit torque to the vehicle traction wheel assemblies and permit the traction wheel assemblies to rotate at different velocities. For example, the differential assembly 32 may be operatively connected to the axle shafts 34 and may permit the axle shafts 34 to rotate at different rotational speeds about a corresponding axis or axes, such as a first axis 60. In at least one configuration, the differential assembly 32 may include a differential case 70, a ring gear 72, a first differential gear 74, a second differential gear 76, and at least one pinion gear 78.

The differential case 70 may be configured to receive components of the differential assembly 32. In addition, the differential case 70 may be rotatable about the first axis 60, which may also be referred to as a differential axis. For example, the differential case 70 may be rotatably supported by a pair of roller bearing assemblies, which in turn may be mounted to a portion of the housing assembly 30, such as a differential carrier. The differential case 70 may at least partially define a cavity that may at least partially receive the first differential gear 74, second differential gear 76, and pinion gear(s) 78.

The ring gear 72 may be fixedly disposed on the differential case 70 or fixedly mounted to the differential case 70. As such, the ring gear 72 may rotate about the first axis 60 with the differential case 70. The ring gear 72 may extend around the first axis 60 and may have a set of ring gear teeth that may contact and mate or mesh with teeth of the drive pinion 36. As such, torque may be transmitted between an electric motor and the differential assembly 32 via the meshing teeth of the drive pinion 36 and the ring gear 72.

The first differential gear 74 may be disposed in the differential case 70. The first differential gear 74 may be coupled or operatively connectable to an axle shaft 34. As an example, the axle shaft 34 and the first differential gear 74 may be rotatable together about the first axis 60. The first differential gear 74 may be coupled or operatively connected to the axle shaft 34 in any suitable manner. For instance, the first differential gear 74 may have a hole that may receive the axle shaft 34 and the axle shaft 34 and first differential gear 74 may be coupled with mating splines, a weld, fastener, or the like. The first differential gear 74 may also have gear portion that may have a set of teeth that may be arranged around the first axis 60 and that may mate or mesh with teeth on one or more pinion gears 78.

The second differential gear 76 may be disposed in the differential case 70. The second differential gear 76 may be spaced apart from the first differential gear 74 and may have a similar or identical configuration as the first differential gear 74. As such, the second differential gear 76 may be coupled to or operatively connectable to another axle shaft 34 in any suitable manner. The axle shaft 34 and the second differential gear 76 may be rotatable together about the first axis 60. The second differential gear 76 may also have gear portion that may have a set of teeth that may be arranged around the first axis 60 and that may mate or mesh with teeth on one or more pinion gears 78.

At least one pinion gear 78 may be received in the differential case 70. A pinion gear 78 may include a set of teeth that mate or mesh with teeth on the first differential gear 74 and teeth on the second differential gear 76. In addition, a pinion gear 78 may be rotatable with respect to the differential case 70 or rotatably mounted on the differential case 70. For instance, a pinion gear 78 may receive and may be rotatable about a shaft or a spider that may extend from or may be mounted to the differential case 70 such that the shaft or spider may be rotatable about the first axis 60 with the differential case 70.

The axle shafts 34 may transmit torque from the differential assembly 32 to corresponding traction wheel assemblies. For example, two axle shafts 34 may be provided such that each axle shaft 34 extends into or through a different arm portion 52 of housing assembly 30. The axle shafts 34 may extend along and may be rotatable about corresponding axes. Each axle shaft 34 may have a first end and a second end. The first end may be operatively connected to the differential assembly 32. The second end may be disposed opposite the first end and may be operatively connected to a corresponding wheel end assembly that may have a wheel hub that may support a wheel assembly 20. Optionally, gear reduction may be provided between an axle shaft 34 and a wheel assembly 20, such as with a gear reduction unit 80 having any suitable configuration. For instance, the gear reduction unit 80 may be configured with bevel gears or a planetary gear set in a manner known by those skilled in the art.

The drive pinion 36 may be at least partially received in the housing assembly 30. The drive pinion 36 may be selectively connectable with an electric motor as will be discussed in more detail below. As such, the drive pinion 36 may help operatively connect an electric motor to the differential assembly 32. The drive pinion 36 may extend along and may be rotatable about a second axis 90. The second axis 90 may be disposed perpendicular or substantially perpendicular to the first axis 60. In at least one configuration, the drive pinion 36 may include a gear portion 92 and a shaft portion 94.

The gear portion 92 may be disposed at or near an end of the drive pinion 36. The gear portion 92 may have a plurality of teeth that may mate or mesh with corresponding teeth on a ring gear 72 of the differential assembly 32. As such, the drive pinion 36 may transmit torque between an electric motor and the ring gear 72 when the electric motor is operatively connected to the drive pinion 36.

The shaft portion 94 may extend along and may be rotatable about the second axis 90 with the gear portion 92. The shaft portion 94 may be operatively connectable to an electric motor as will be discussed in more detail below. The shaft portion 94 may be integrally formed with the gear portion 92 or may be provided as a separate component that may be fixedly coupled to the gear portion 92.

The first electric motor 38 may be selectively connectable to the differential assembly 32. More specifically, the first electric motor 38 may be selectively connectable to the drive pinion 36, and hence to the differential assembly 32, via the first gear set 42. In addition, the first electric motor 38 may be electrically connected to an electrical power source 100, such as a battery, capacitor, or the like. An inverter may electrically connect the first electric motor 38 and the electrical power source 100. The first electric motor 38 may have any suitable configuration. For instance, the first electric motor 38 may be a brushless direct current (DC) permanent magnet motor. In at least one configuration, the first electric motor 38 may include a first stator and a first rotor.

The first stator may be fixedly positioned with respect to the housing assembly 30. For example, the first stator may extend around a first motor axis 110 and may not rotate about the first motor axis 110. The first stator may include windings that may be electrically connected to the electrical power source 100.

The first rotor may extend around the first motor axis 110 and may be received inside the stator. The first rotor may be rotatable about the first motor axis 110 with respect to the first stator. For example, the first rotor may be spaced apart from the first stator and may include magnets or ferromagnetic material that may facilitate the generation of electrical current. The first rotor may be operatively connected to the drive pinion 36 via a first motor shaft 112 and the first gear set 42 as will be discussed in more detail below. The first motor shaft 112 may be rotatable about the first motor axis 110.

The second electric motor 40 may be selectively connectable to the differential assembly 32. More specifically, the second electric motor 40 may be selectively connectable to the drive pinion 36, and hence to the differential assembly 32, via the second gear set 44. In addition, the second electric motor 40 may be electrically connected to an electrical power source 100, such as a battery, capacitor, or the like. An inverter may electrically connect the second electric motor 40 and the electrical power source 100. The second electric motor 40 may have any suitable configuration. For instance, the second electric motor 40 may be a brushless direct current (DC) permanent magnet motor. In at least one configuration, the second electric motor 40 may include a second stator and a second rotor.

The second stator may be fixedly positioned with respect to the housing assembly 30. For example, the second stator may extend around a second motor axis 120 and may not rotate about the second motor axis 120. The second stator may include windings that may be electrically connected to the electrical power source 100.

The second rotor may extend around the second motor axis 120 and may be received inside the second stator. The second rotor may be rotatable about the second motor axis 120 with respect to the second stator. For example, the second rotor may be spaced apart from the second stator and may include magnets or ferromagnetic material that may facilitate the generation of electrical current. The second rotor may be operatively connected to the drive pinion 36 via a second motor shaft 122 and the second gear set 44 as will be discussed in more detail below. The second motor shaft 122 may be rotatable about the second motor axis 120. The first motor axis 110 may be disposed substantially parallel to the second motor axis 120. The first motor axis 110 may not be coaxially disposed with the second motor axis 120 in one or more configurations.

Figure 15:
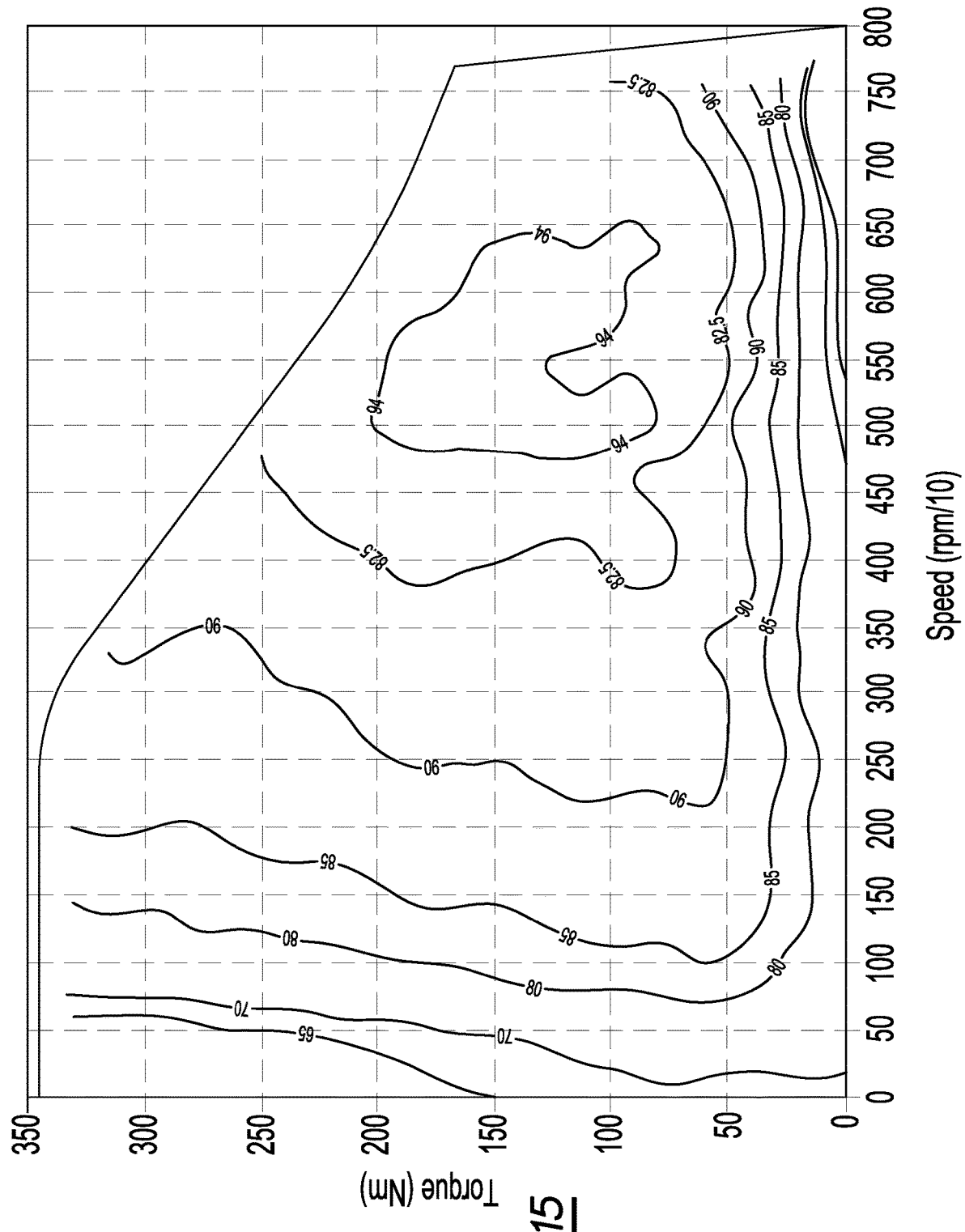
FIGS. 15 and 16 are examples of different efficiency maps for different electric motors.
Figure 16:
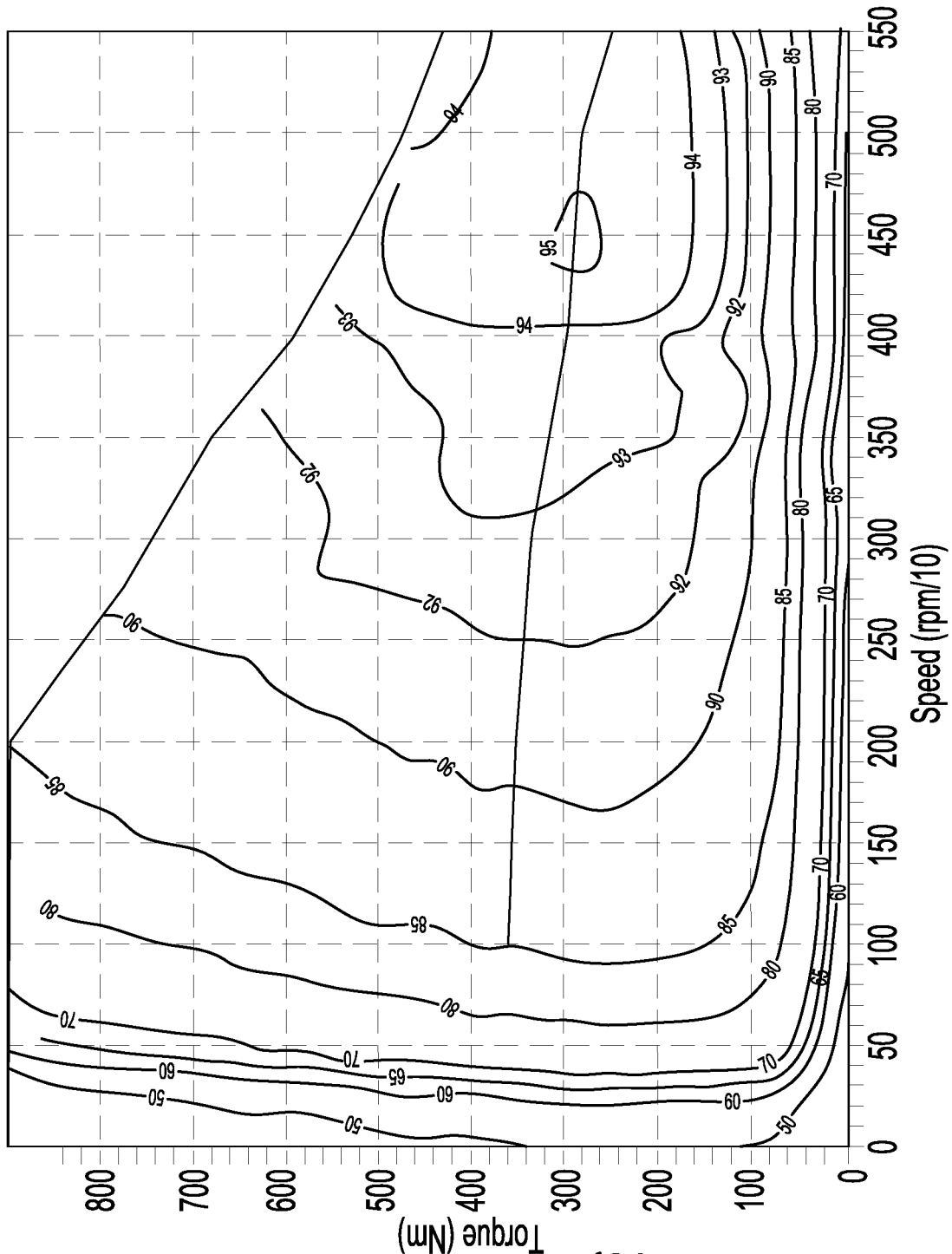

The first electric motor 38 may have different performance characteristics than the second electric motor 40. Referring to FIGS. 15 and 16, examples of efficiency maps or performance curves for the first electric motor 38 and the second electric motor 40 are shown. The contour lines on the efficiency maps depict the operating efficiency of an electric motor at various rotational speeds (plotted along the horizontal axis) and output torques (plotted along the vertical axis). The contour lines in FIG. 15 differ from the contour lines in FIG. 16. For instance, in FIG. 15 the 95% efficiency contour line or "peak efficiency" is plotted at rotational speeds between approximately 425 rpm/10 to 475 rpm/10 and in a torque range of approximately 275 Nm to 325 Nm while the 94% efficiency contour line or "peak efficiency" in FIG. 16 is plotted at rotational speeds between approximately 475 rpm/10 to 650 rpm/10 and in a torque range of approximately 80 Nm to 200 Nm. As such, the electric motors may have "peak efficiency" in different rpm (revolutions per minute) ranges. Moreover the 94% efficiency contour line in FIG. 15 may differ from that in FIG. 16. As such, the first electric motor 38 and the second electric motor 40 may be operable at the same efficiency at different rotational speeds and/or torques. Providing electric motors with different performance characteristics may allow an electric motor having better performance or higher efficiency to be selected and operated to provide torque to the differential assembly, thereby improving operational performance of the drive axle system. For instance, an electric motor may be selected for operation based on the output torque desired and the operating efficiency of the motor (e.g., the electric motor having a higher efficiency at a desired torque may be selected). Moreover, it is contemplated that the rotational speed of the selected electric motor or electric motors may be controlled to help keep an associated electric motor operating within a higher efficiency contour.

Referring to FIG. 1, the first gear set 42 may be at least partially received in the housing assembly 30. The first gear set 42 may include a plurality of gears. For example, the first gear set 42 may include a first gear 130 and a second gear 132; however, it is contemplated that a greater number of gears may be provided. The gears of the first gear set 42 may be rotatable about different axes and may have the same diameters or different diameters.

The first gear 130 may be fixedly disposed on the first motor shaft 112 or fixedly mounted to the first motor shaft 112. As such, the first gear 130 may rotate about the first motor axis 110 with the first motor shaft 112. The first gear 130 may extend around the first motor axis 110 and may have a plurality of teeth that may be arranged around and may face away from the first motor axis 110.

The second gear 132 may be rotatable about the second axis 90. The second gear 132 may have a plurality of teeth that may be arranged around and may face away from the second axis 90 and that may mesh with the teeth of the first gear 130. The second gear 132 may be selectively coupled to the drive pinion 36, such as with a clutch as will be discussed in more detail below. The second gear 132 may be rotatable about the second axis 90 with the drive pinion 36 when the second gear 132 is coupled to the drive pinion 36. The drive pinion 36 may be rotatable about the second axis 90 with respect to the second gear 132 when the second gear 132 is not coupled to the drive pinion 36. In at least one configuration, the second gear 132 may receive the shaft portion 94 of the drive pinion 36. In such a configuration, a bearing may be provided inside a hole in the second gear 132 between the second gear 132 and the drive pinion 36 to facilitate rotation of the drive pinion 36 with respect to the second gear 132.

The second gear set 44 may be at least partially received in the housing assembly 30. The second gear set 44 may include a plurality of gears. For example, the second gear set 44 may include a third gear 140 and a fourth gear 142; however, it is contemplated that a greater number of gears may be provided. The gears of the second gear set 44 may be rotatable about different axes and may have the same diameters or different diameters. In addition, one or more gears of the second gear set 44 may have a different diameter than one or more gears of the first gear set 42. As such, the first gear set 42 may have a different gear ratio than the second gear set 44. Different gear ratios may be configured to be suited for different vehicle speed ranges. As an example, one gear ratio may be suited for lower speed travel (e.g., below 60 mph or 96.6 km/h) while another gear ratio may be suited for high speed travel (e.g., above 60 mph or 96.6 km/h).

The third gear 140 may be fixedly disposed on the second motor shaft 122 or fixedly mounted to the second motor shaft 122. As such, the third gear 140 may rotate about the second motor axis 120 with the second motor shaft 122. The third gear 140 may extend around the second motor axis 120 and may have a plurality of teeth that may be arranged around and may face away from the second motor axis 120.

The fourth gear 142 may be rotatable about the second axis 90. The fourth gear 142 may have a plurality of teeth that may be arranged around and may face away from the second axis 90 and that may mesh with the teeth of the third gear 140. The fourth gear 142 may be selectively coupled to the drive pinion 36, such as with a clutch as will be discussed in more detail below. The fourth gear 142 may be rotatable about the second axis 90 with the drive pinion 36 when the fourth gear 142 is coupled to the drive pinion 36. The drive pinion 36 may be rotatable about the second axis 90 with respect to the fourth gear 142 when the fourth gear 142 is not coupled to the drive pinion 36. In at least one configuration, the fourth gear 142 may receive the shaft portion 94 of the drive pinion 36. In such a configuration, a bearing may be provided inside a hole in the fourth gear 142 between the fourth gear 142 and the drive pinion 36 to facilitate rotation of the drive pinion 36 with respect to the fourth gear 142.

The control system 46 may control operation of the drive axle system 10. For instance, the control system 46 may include one or more electronic controllers, such as a microprocessor-based controller, that may monitor and/or control operation of various components of the drive axle system 10, such as the first electric motor 38, the second electric motor 40, and the electrical power source 100. In addition, the control system 46 may control coupling and decoupling of the first gear set 42 and the second gear set 44. For instance, the control system 46 may control operation of one or more clutches that may couple/decouple at least one gear from a corresponding shaft.

A clutch may have any suitable configuration. For example, the clutch may be configured as a disc clutch that may include friction discs that may be selectively engaged to couple a gear to a corresponding shaft, such as the shaft portion 94 of the drive pinion 36. Alternatively, the clutch may be configured as a dog clutch or clutch collar that may receive, rotate with, and slide along a corresponding shaft, such as the shaft portion 94, to selectively couple and decouple a gear of a gear set to and from the shaft. For instance, the clutch and the shaft portion 94 may have mating splines that inhibit rotation of the clutch with respect to the shaft portion 94 while allowing the clutch to slide in an axial direction along the second axis 90 with respect to the shaft portion 94 to engage or disengage a gear. Such a clutch may have a tooth or teeth that may be configured to selectively mate or mesh with corresponding teeth on a member of the first gear set 42 or a member of the second gear set 44 to couple the gear to the drive pinion 36 such that the gear is rotatable about the second axis 90 with the drive pinion 36. The tooth or teeth of the clutch may be configured as a face gear that may be disposed along a lateral side of the clutch or may be configured like a spline and may be received inside a hole of a gear. Clutches will primarily be described below as having a dog clutch or clutch collar configuration; however, it is to be understood that a clutch may have a different configuration and may not be configured as a dog clutch or a clutch collar.

In at least one configuration, a first clutch 150 and a second clutch 152 may be provided. In FIG. 1, the first clutch 150 in the second clutch 152 are illustrated as being axially positioned along the second axis 90 between the second gear 132 and the fourth gear 142; however, it is contemplated that the first clutch 150 may be disposed on the opposite side of the second gear 132, the second clutch 152 may be disposed on the opposite side of the fourth gear 142, or combinations thereof. In FIG. 1, it is also illustrated that the first clutch 150 and the second clutch 152 are associated with different actuators, namely a first actuator 160 and a second actuator 162, respectively. This configuration will be primarily described in the text below; however, it is contemplated that a single actuator or actuator mechanism may be provided to actuate the first clutch 150 and the second clutch 152.

The first clutch 150 may be operatively connected to the first actuator 160 with a first linkage 170, such as a shift fork. The first actuator 160 may be of any suitable type. For example, the first actuator 160 may be an electrical, electromechanical, pneumatic, or hydraulic actuator. In at least one configuration, such as when the first clutch 150 is a clutch collar or dog clutch, the first actuator 160 may move the first clutch 150 along the second axis 90 and may execute a shift when the rotational speed of the first clutch 150 and the second gear 132 are sufficiently synchronized to complete a shift so that the teeth of the first clutch 150 may mesh with teeth on the second gear 132 or so that the teeth of the first clutch 150 gear may disengage from teeth on second gear 132. The control system 46 may monitor and/or control operation of the first actuator 160.

The second clutch 152 may be operatively connected to the second actuator 162 with a second linkage 172, such as a shift fork. The second actuator 162 may be of any suitable type. For example, the second actuator 162 may be an electrical, electromechanical, pneumatic, or hydraulic actuator. In at least one configuration, such as when the second clutch 152 is a clutch collar or dog clutch, the second actuator 162 may move the second clutch 152 along the second axis 90 and may execute a shift when the rotational speed of the second clutch 152 and the fourth gear 142 are sufficiently synchronized to complete a shift so that the teeth of the second clutch 152 may mesh with teeth on the fourth gear 142 or so that the teeth of the second clutch 152 gear may disengage from teeth on the fourth gear 142. The control system 46 may monitor and/or control operation of the second actuator 162.

Sufficient synchronization to permit shifting or movement of a clutch, like the first clutch 150 or the second clutch 152, may be attained using a gear synchronizer, by controlling the rotational speed of a rotor, or combinations thereof. Such synchronization components or control actions may be omitted with different clutch configurations, such as a clutch that is a disc clutch, cone clutch, or the like.

Referring to FIGS. 1-4, examples of different clutch positions are shown. The control system 46 may actuate the first clutch 150 and the second clutch 152 to a desired position based on an operator input or an automated shift control routine.

Referring to FIG. 1, the first clutch 150 and the second clutch 152 are shown in first positions, which may also be referred to as neutral positions. The first clutch 150 may not couple the first gear set 42 to the drive pinion 36 when the first clutch 150 is in the first position. For instance, the first clutch 150 may not couple the second gear 132 to the drive pinion 36 when the first clutch 150 is in its first position. Likewise, the second clutch 152 may not couple a gear of the second gear set 44 to the drive pinion 36 when the second clutch 152 is in its first position. For instance, the second clutch 152 may not couple the fourth gear 142 to the drive pinion 36 when the second clutch 152 is in the first position. The drive pinion 36 may be free to rotate about the second axis 90 with respect to the first gear set 42 and the second gear set 44 when the first clutch 150 and the second clutch 152 are in their respective first positions or neutral positions. Thus, torque may not be transmitted between the first electric motor 38 and the drive pinion 36 when the first clutch 150 is in its neutral position and torque may not be transmitted between the second electric motor 40 and the drive pinion 36 when the second clutch 152 is in its neutral position.

Figure 2:
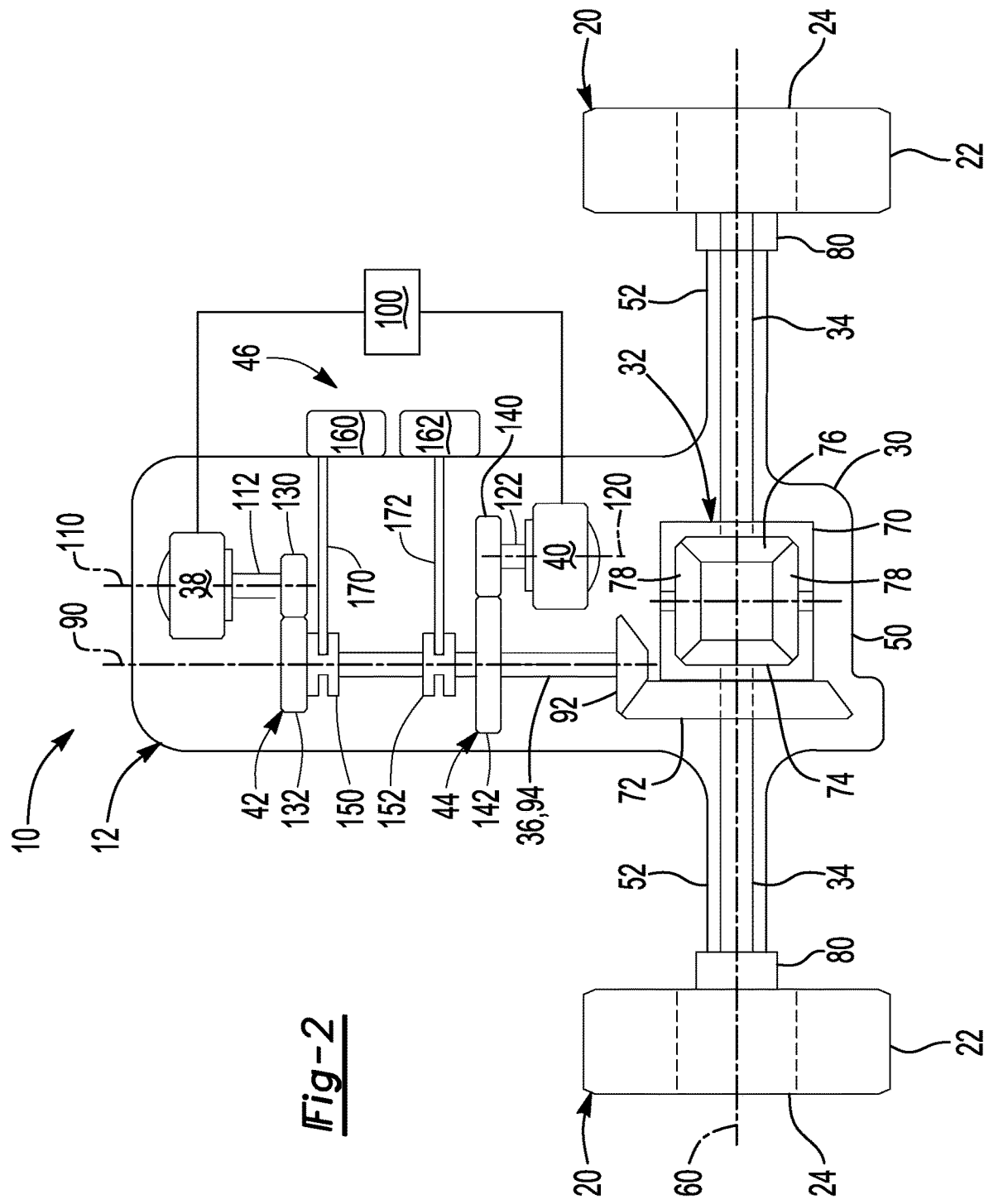
FIG. 2 depicts the drive axle system of FIG. 1 with the first clutch in a second position and the second clutch in the first position.

Referring to FIG. 2, the first clutch 150 is shown in a second position and the second clutch 152 is shown in the first position. The first clutch 150 may be moved to the second position by the first actuator 160. In the second position, the first clutch 150 may couple the second gear 132 to the drive pinion 36 such that the second gear 132 is rotatable about the second axis 90 with the drive pinion 36. Accordingly, torque may be transmitted to or from the drive pinion 36 via the first gear 130, the second gear 132, and the first clutch 150. The fourth gear 142 may not be coupled to the drive pinion 36 by the second clutch 152. Thus, the drive pinion 36 may be rotatable with respect to the fourth gear 142 and torque may not be transmitted via the second gear set 44 between the drive pinion 36 and the second electric motor 40. A first gear ratio may be provided when the second gear 132 is coupled to the drive pinion 36.

Figure 3:
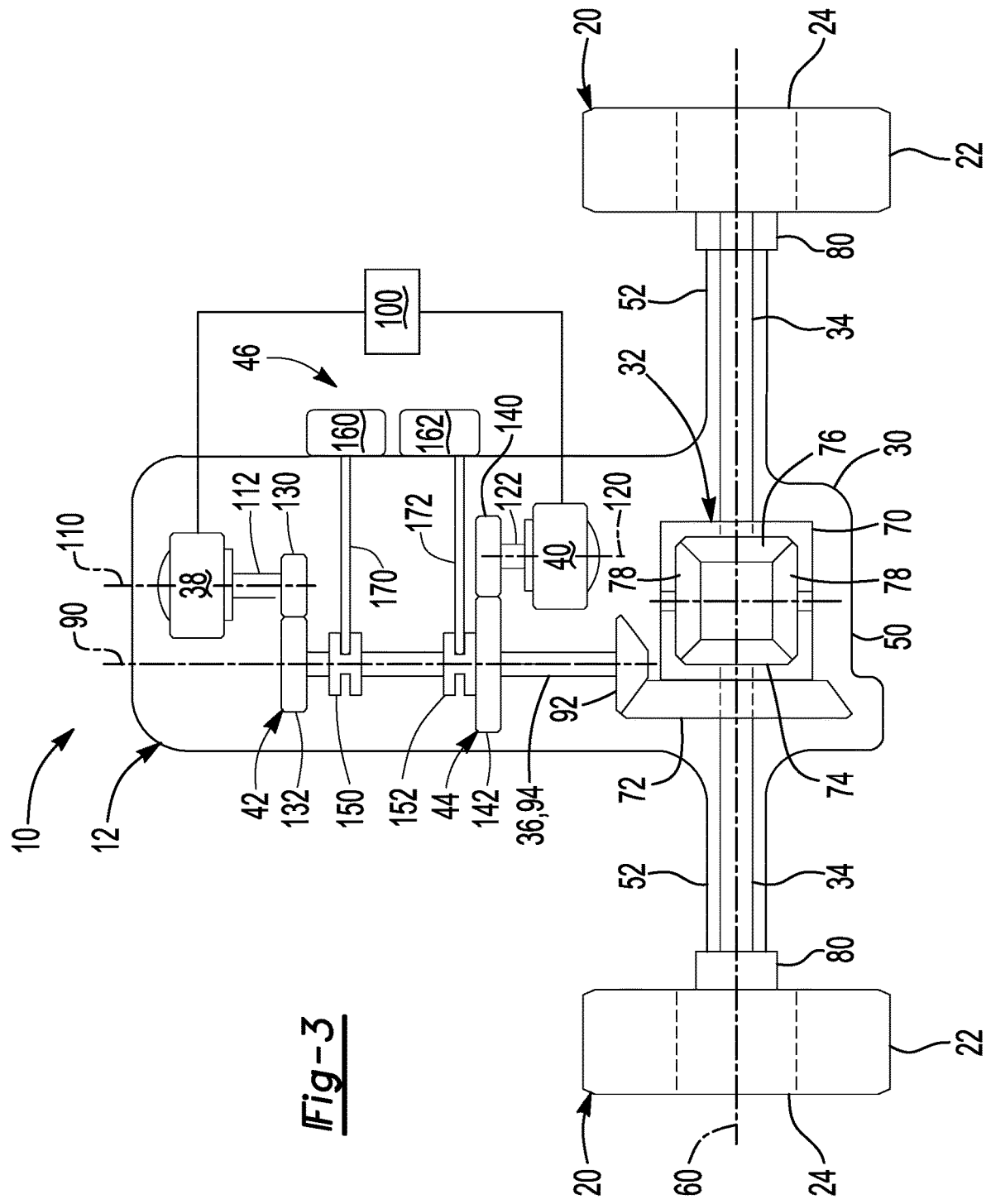
FIG. 3 depicts the drive axle system of FIG. 1 with the first clutch in the first position and the second clutch in a second position.

Referring to FIG. 3, the first clutch 150 is shown in the first position and the second clutch 152 is shown in a second position. The second clutch 152 may be moved to the second position by the second actuator 162. In the second position, the second clutch 152 may couple the fourth gear 142 to the drive pinion 36 such that the fourth gear 142 is rotatable about the second axis 90 with the drive pinion 36. Accordingly, torque may be transmitted to or from the drive pinion 36 via the third gear 140, the fourth gear 142, and the second clutch 152. The second gear 132 may not be coupled to the drive pinion 36 by the first clutch 150. Thus, the drive pinion 36 may be rotatable with respect to the second gear 132 and torque may not be transmitted via the first gear set 42 between the drive pinion 36 and the first electric motor 38. A second gear ratio that may differ from the first gear ratio may be provided when the fourth gear 142 is coupled to the drive pinion 36.

Figure 4:
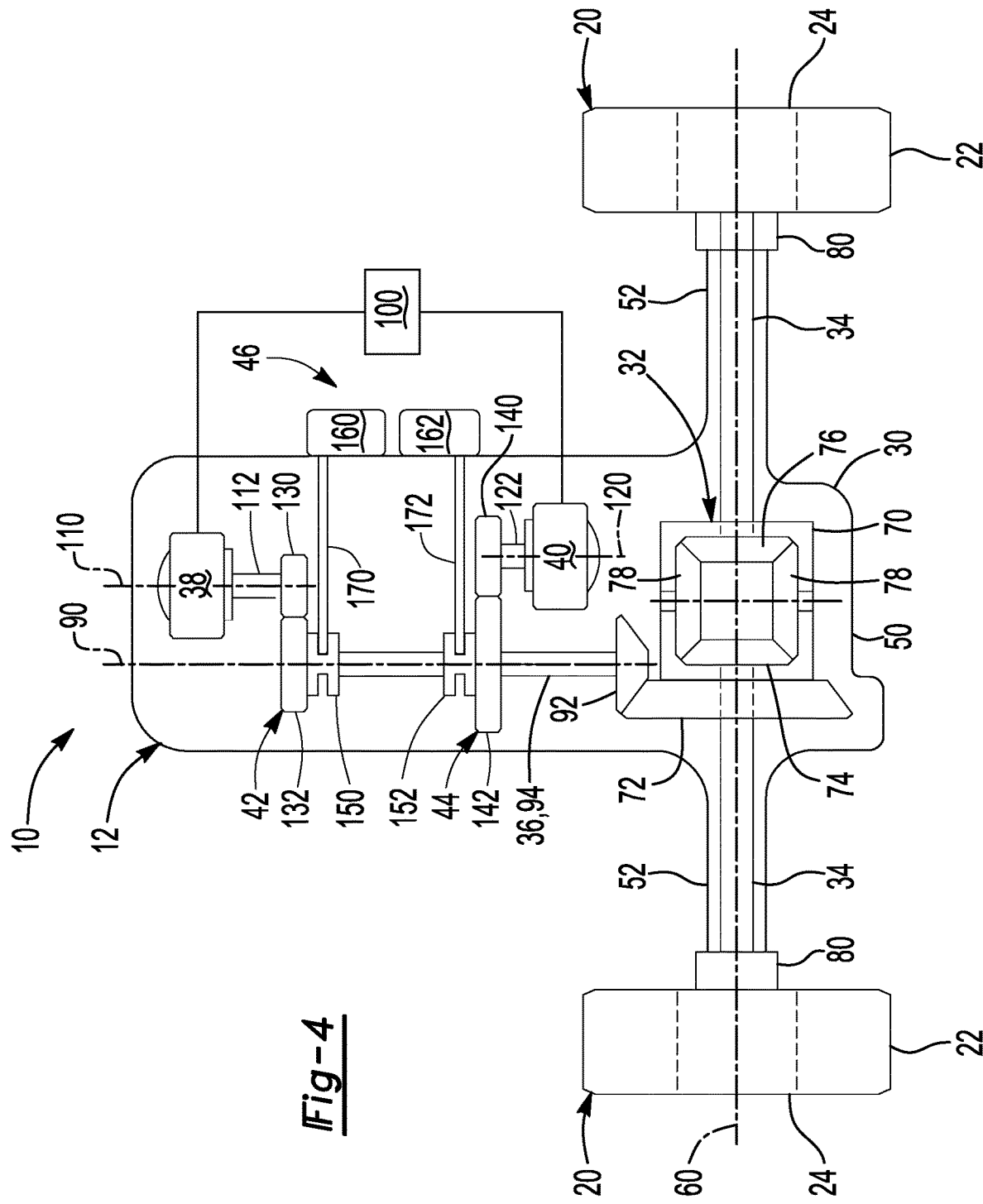
FIG. 4 depicts the drive axle system of FIG. 1 with the first clutch in the second position and the second clutch in the second position.

Referring to FIG. 4, the first clutch 150 and the second clutch 152 are shown in their respective second positions. As such, the first clutch 150 may couple the second gear 132 to the drive pinion 36 and the second clutch 152 may couple the fourth gear 142 to the drive pinion 36 such that the second gear 132 and the fourth gear 142 are rotatable about the second axis 90 with the drive pinion 36. Thus, torque may be transmitted between the drive pinion 36 and the first electric motor 38 via the first gear set 42 and torque may be transmitted between the drive pinion 36 and the second electric motor 40 via the second gear set 44. Accordingly, the first electric motor 38 and the second electric motor 40 may both provide torque to the drive pinion 36 and hence to the differential assembly 32 to propel the vehicle.

Referring to FIGS. 5-12, another configuration of a drive axle system is shown. This configuration may include an axle assembly 12' having a housing assembly 30, a differential assembly 32, a drive pinion 36, axle shafts 34, a first electric motor 38, a second electric motor 40, and a control system 46 similar to that previously described. However, this configuration may include one gear set or a common gear set 200 that may selectively connect the drive pinion 36 to the first electric motor 38 and/or the second electric motor 40. In addition, this configuration may also include an auxiliary gear mechanism 202 that may selectively connect an auxiliary device 204 to the first electric motor 38 and/or the second electric motor 40.

In this configuration, the first electric motor 38 and the second electric motor 40 may be coaxially disposed. As such, the first motor shaft 112 of the first electric motor 38 and the second motor shaft 122 of the second electric motor 40 may be rotatable about a common motor axis 210.

The gear set 200 may be at least partially received in the housing assembly 30. The gear set 200 may include a plurality of gears. For example, the gear set 200 may include a first gear 230 and a second gear 232; however, it is contemplated that a greater number of gears may be provided. The gears of the gear set 200 may be rotatable about different axes. In addition, the gears of the gear set 200 may have different diameters and may provide a desired amount of gear reduction between the drive pinion 36 and electric motors.

The first gear 230 may be rotatable about the motor axis 210. More specifically, the first motor shaft 112 may be rotatable about the motor axis 210 with the first motor shaft 112, the second motor shaft 122, or both depending on the position of the clutches as will be described in more detail below. The first gear 230 may extend around the motor axis 210 and may have a plurality of teeth that may be arranged around and may face away from the motor axis 210. The first gear 230 may be rotatably supported on the first motor shaft 112, the second motor shaft 122, or both. For instance, an end of the first motor shaft 112, an end of the second motor shaft 122, or both may be received in a hole in the first gear 230. A bearing may be provided inside the hole in the first gear 230 between the first gear 230 and a motor shaft to facilitate rotation of the first gear 230 with respect to a motor shaft.

The second gear 232 may be rotatable about the second axis 90. The second gear 232 may have a plurality of teeth that may mesh with the teeth of the first gear 230. The second gear 232 may be fixedly coupled to the drive pinion 36. As such, the second gear 232 may be rotatable about the second axis 90 with the drive pinion 36.

The auxiliary gear mechanism 202 may be at least partially received in the housing assembly 30. The auxiliary gear mechanism 202 may facilitate the transmission of torque between the auxiliary device 204 and the first electric motor 38, the second electric motor 40, or both. In at least one configuration, the auxiliary gear mechanism may include an auxiliary shaft 240, a first auxiliary gear set 242, and a second auxiliary gear set 244.

The auxiliary shaft 240 may be at least partially received in the housing assembly 30. For example, the auxiliary shaft 240 may protrude from the housing assembly 30. The auxiliary shaft 240 may be rotatable about an auxiliary shaft axis 250. In at least one configuration, the auxiliary shaft axis 250 may extend substantially parallel to the motor axis 210. The auxiliary shaft 240 may be connected to or connectable to the auxiliary device 204 and may function as an output from the axle assembly 12, an input to the axle assembly 12, or combinations thereof. For instance, the auxiliary shaft 240 may function as an output or a power take-off (PTO) that may transfer power or torque from the axle assembly 12' to an auxiliary device 204 that may be operatively connected to the auxiliary shaft 240. Examples of an auxiliary device 204 include but are not limited to a pump, ladder, vacuum, blower, compressor, winch, mechanical arm, compactor, boom, grapple, tree spade, dump truck bed lift, or the like. The auxiliary shaft 240 may also function as an input that may receive power or torque from an auxiliary device 204, such as a motor.

The first auxiliary gear set 242 may be received in the housing assembly 30. The first auxiliary gear set 242 may include a plurality of gears. For example, the first auxiliary gear set 242 may include a first auxiliary gear 260 and a second auxiliary gear 262; however, it is contemplated that a greater number of gears may be provided. The gears of the first auxiliary gear set 242 may be rotatable about different axes and may have the same or different diameters.

The first auxiliary gear 260 may be fixedly disposed on the auxiliary shaft 240. As such, the first auxiliary gear 260 may rotate about the auxiliary shaft axis 250 with the auxiliary shaft 240. The first auxiliary gear 260 may extend around the auxiliary shaft axis 250 and may include a plurality of teeth that may be arranged around and may face away from the auxiliary shaft axis 250.

The second auxiliary gear 262 may be rotatable about the motor axis 210. The second auxiliary gear 262 may have a plurality of teeth that may mesh with the teeth of the first auxiliary gear 260. The second auxiliary gear 262 may be selectively coupled to the first motor shaft 112, such as with a first clutch 160 as will be described in more detail below. The second auxiliary gear 262 may be rotatable about the motor axis 210 with the first motor shaft 112 when the second auxiliary gear 262 is coupled to the first motor shaft 112. The first motor shaft 112 may be rotatable about the motor axis 210 with respect to the second auxiliary gear 262 when the second auxiliary gear 262 is not coupled to the first motor shaft 112. In at least one configuration, the second auxiliary gear 262 may receive the first motor shaft 112. A bearing may be provided inside a hole in the second auxiliary gear 262 between the second auxiliary gear 262 and the first motor shaft 112 to facilitate rotation of the first motor shaft 112 with respect to the second auxiliary gear 262.

The second auxiliary gear set 244 may be received in the housing assembly 30. The second auxiliary gear set 244 may include a plurality of gears. For example, the second auxiliary gear set 244 may include a third auxiliary gear 270 and a fourth auxiliary gear 272; however, it is contemplated that a greater number of gears may be provided. The gears of the second auxiliary gear set 244 may be rotatable about different axes and may have the same or different diameters. The gears of the second auxiliary gear set 244 may or may not have different diameters than corresponding gears of the first auxiliary gear set 242. The first auxiliary gear set 242 may have a different gear ratio than the second auxiliary gear set 244 in a configuration where one or more gears of the second auxiliary gear set 244 have a different diameter than one or more gears of the first auxiliary gear set 242.

The third auxiliary gear 270 may be fixedly disposed on the auxiliary shaft 240. As such, the third auxiliary gear 270 may rotate about the auxiliary shaft axis 250 with the auxiliary shaft 240. The third auxiliary gear 270 may extend around the auxiliary shaft axis 250 and may include a plurality of teeth that may be arranged around and may face away from the auxiliary shaft axis 250.

The fourth auxiliary gear 272 may be rotatable about the motor axis 210. The fourth auxiliary gear 272 may have a plurality of teeth that may mesh with the teeth of the third auxiliary gear 270. The fourth auxiliary gear 272 may be selectively coupled to the second motor shaft 122, such as with a second clutch 162 as will be described in more detail below. The fourth auxiliary gear 272 may be rotatable about the motor axis 210 with the second motor shaft 122 when the fourth auxiliary gear 272 is coupled to the second motor shaft 122. The second motor shaft 122 may be rotatable about the motor axis 210 with respect to the fourth auxiliary gear 272 when the fourth auxiliary gear 272 is not coupled to the second motor shaft 122. In at least one configuration, the fourth auxiliary gear 272 may receive the second motor shaft 122. A bearing may be provided inside a hole in the fourth auxiliary gear 272 between the fourth auxiliary gear 272 and the second motor shaft 122 to facilitate rotation of the second motor shaft 122 with respect to the fourth auxiliary gear 272.

The control system 46 may be similar to that previously described. For example, a first clutch 150 and a second clutch 152 may be provided that may be configured to selectively connect or disconnect an associated electric motor from the drive pinion 36. The first clutch 150 and the second clutch 152 may also be configured to selectively connect or disconnect an associated electric motor from the auxiliary gear mechanism 202. As such, a clutch may selectively couple an electric motor to the gear set 200 or may selectively couple an electric motor to the auxiliary gear mechanism 202. It is also contemplated that additional clutches may be provided. For instance, one clutch may selectively couple an electric motor to the gear set 200 while another clutch may selectively couple the electric motor to the auxiliary gear mechanism 202. The text below will primarily describe a configuration with double acting clutches that may selectively couple and electric motor to the gear set 200 or the auxiliary gear mechanism 202. The text below will primarily describe the clutches is having a dog clutch or clutch collar configuration; however, it is to be understood that a clutch may have a different configuration and may not be configured as a dog clutch or a clutch collar.

In at least one configuration, the first clutch 150 may receive, rotate with, and slide along a shaft, such as the first motor shaft 112. For instance, the first clutch 150 and the first motor shaft 112 may have mating splines that may inhibit rotation of the first clutch 150 with respect to the first motor shaft 112 while allowing the first clutch 150 to slide in an axial direction along the motor axis 210 with respect to the first motor shaft 112 to engage or disengage a gear, such as the first gear 230 or the second auxiliary gear 262. The first clutch 150 may have a tooth or teeth that may extend from opposite sides of the first clutch 150. The tooth or teeth that face toward the first gear 230 may selectively mate or mesh with corresponding teeth of the first gear 230 to couple the first gear 230 to the first motor shaft 112. Similarly, the tooth or teeth that face toward the second auxiliary gear 262 may selectively mate or mesh with corresponding teeth on the second auxiliary gear 262 to couple the second auxiliary gear 262 to the first motor shaft 112.

In at least one configuration, the second clutch 152 may receive, rotate with, and slide along a shaft, such as the second motor shaft 122. For instance, the second clutch 152 and the second motor shaft 122 may have mating splines that may inhibit rotation of the second clutch 152 with respect to the second motor shaft 122 while allowing the second clutch 152 to slide in an axial direction along the motor axis 210 with respect to the second motor shaft 122 to engage or disengage a gear, such as the first gear 230 or the fourth auxiliary gear 272. The second clutch 152 may have a tooth or teeth that may extend from opposite sides of the second clutch 152. The tooth or teeth that face toward the first gear 230 may selectively mate or mesh with corresponding teeth of the first gear 230 to couple the first gear 230 to the second motor shaft 122. Similarly, the tooth or teeth that face toward the fourth auxiliary gear 272 may selectively mate or mesh with corresponding teeth on the fourth auxiliary gear 272 to couple the second auxiliary gear 262 to the second motor shaft 122.

Figure 5:
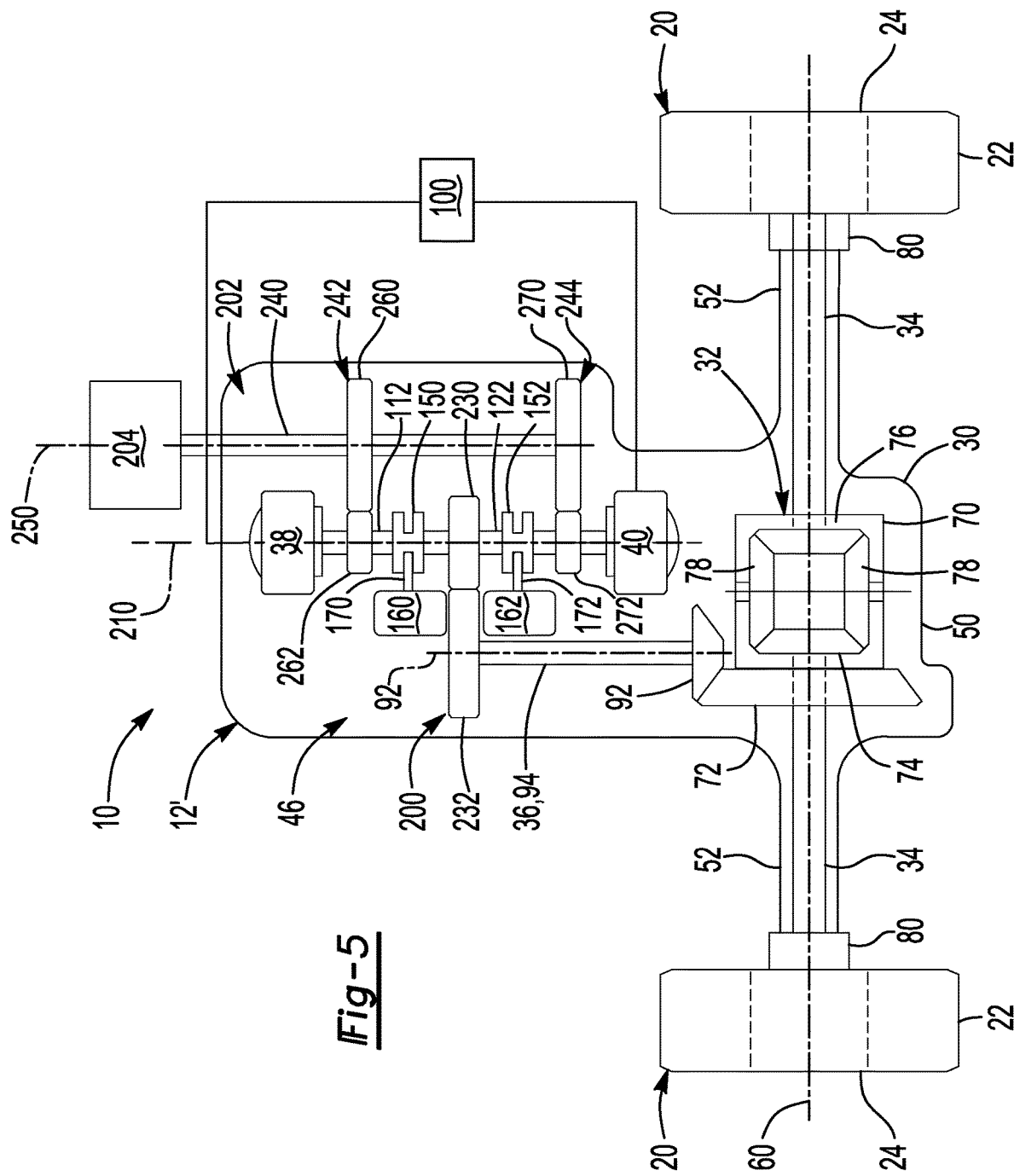
FIG. 5 depicts an example of a drive axle system with a first clutch in a first position and the second clutch in a first position.

Referring to FIG. 5, the first clutch 150 and the second clutch 152 are shown in first positions, which may also be referred to as neutral positions. The first clutch 150 may not couple the first electric motor 38 to the gear set 200 when the first clutch 150 is in the first position. For instance, the first clutch 150 may not couple the first gear 230 to the first motor shaft 112 when the first clutch 150 is in its first position. Likewise, the second clutch 152 may not couple the second electric motor 40 to the gear set 200 when the second clutch 152 is in its first position. The first motor shaft 112 and the second motor shaft 122 may be free to rotate about the motor axis 210 with respect to the first gear 230 when the first clutch 150 and the second clutch 152 are in their respective first positions or neutral positions. Thus, torque may not be transmitted between the first electric motor 38 and the drive pinion 36 when the first clutch 150 is in its neutral position and torque may not be transmitted between the second electric motor 40 and the drive pinion 36 when the second clutch 152 is in its neutral position. In addition, torque may not be transmitted between the first electric motor 38 and the auxiliary gear mechanism 202 when the first clutch 150 is in its first position and torque may not be transmitted between the second electric motor 40 and the auxiliary gear mechanism 202 when the second clutch 152 is in its first position.

Figure 6:
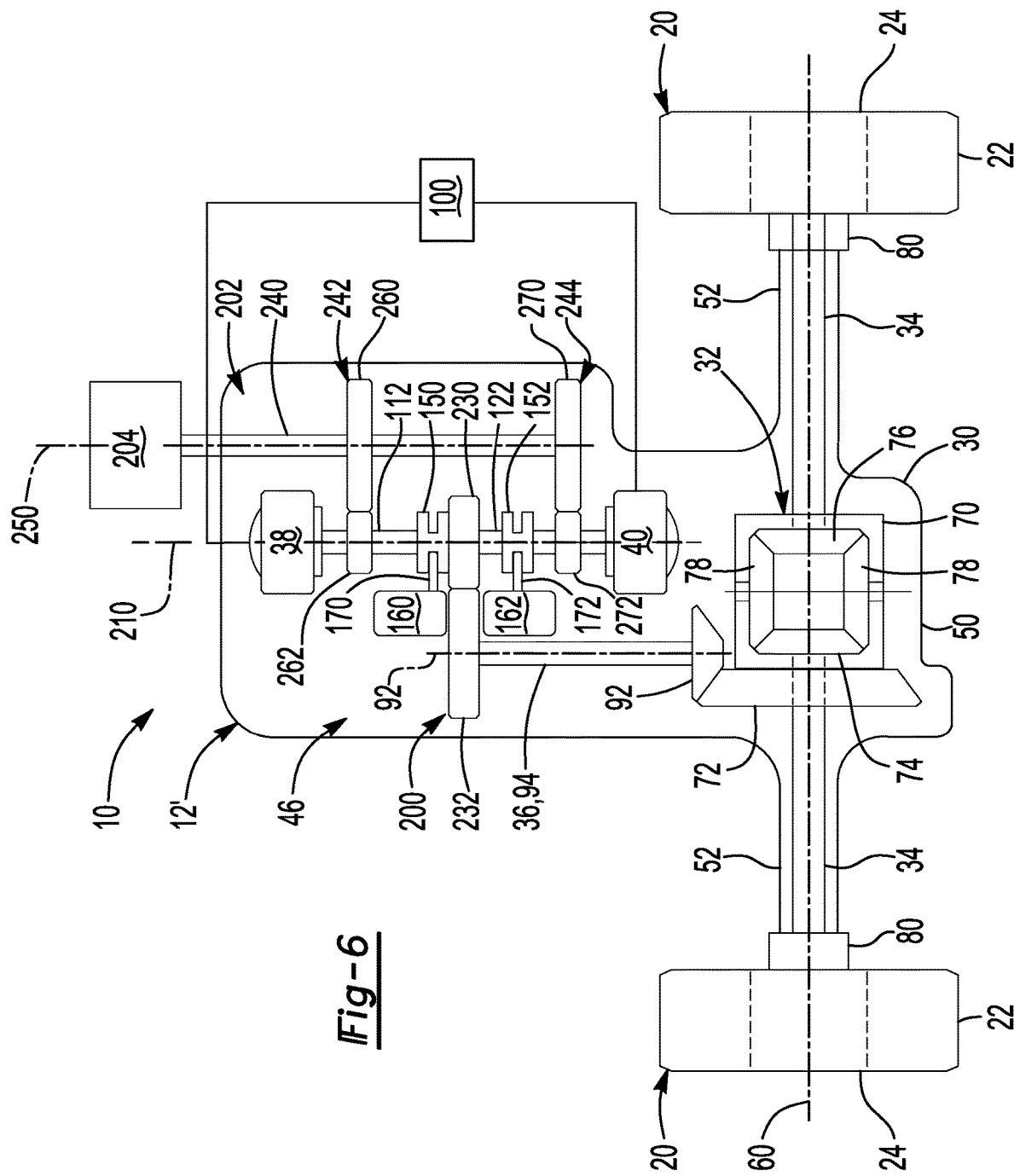
FIG. 6 depicts the drive axle system of FIG. 5 with the first clutch in a second position and the second clutch in the first position.

Referring to FIG. 6, the first clutch 150 is shown in a second position and the second clutch 152 is shown in the first position. The first clutch 150 may be moved to the second position by the first actuator 160. In the second position, the first clutch 150 may couple the first motor shaft 112 to the first gear 230 such that the first gear 230 is rotatable about the motor axis 210 with the first motor shaft 112. Accordingly, torque may be transmitted to or from the drive pinion 36 via the second gear 232, the first gear 230, and the first clutch 150. The first gear 230 is not coupled to the second motor shaft 122 by the second clutch 152. Thus, torque may not be transmitted via the gear set 200 between the drive pinion 36 and the second electric motor 40 or between the second electric motor 40 and the auxiliary gear mechanism 202 as previously discussed.

Figure 7:
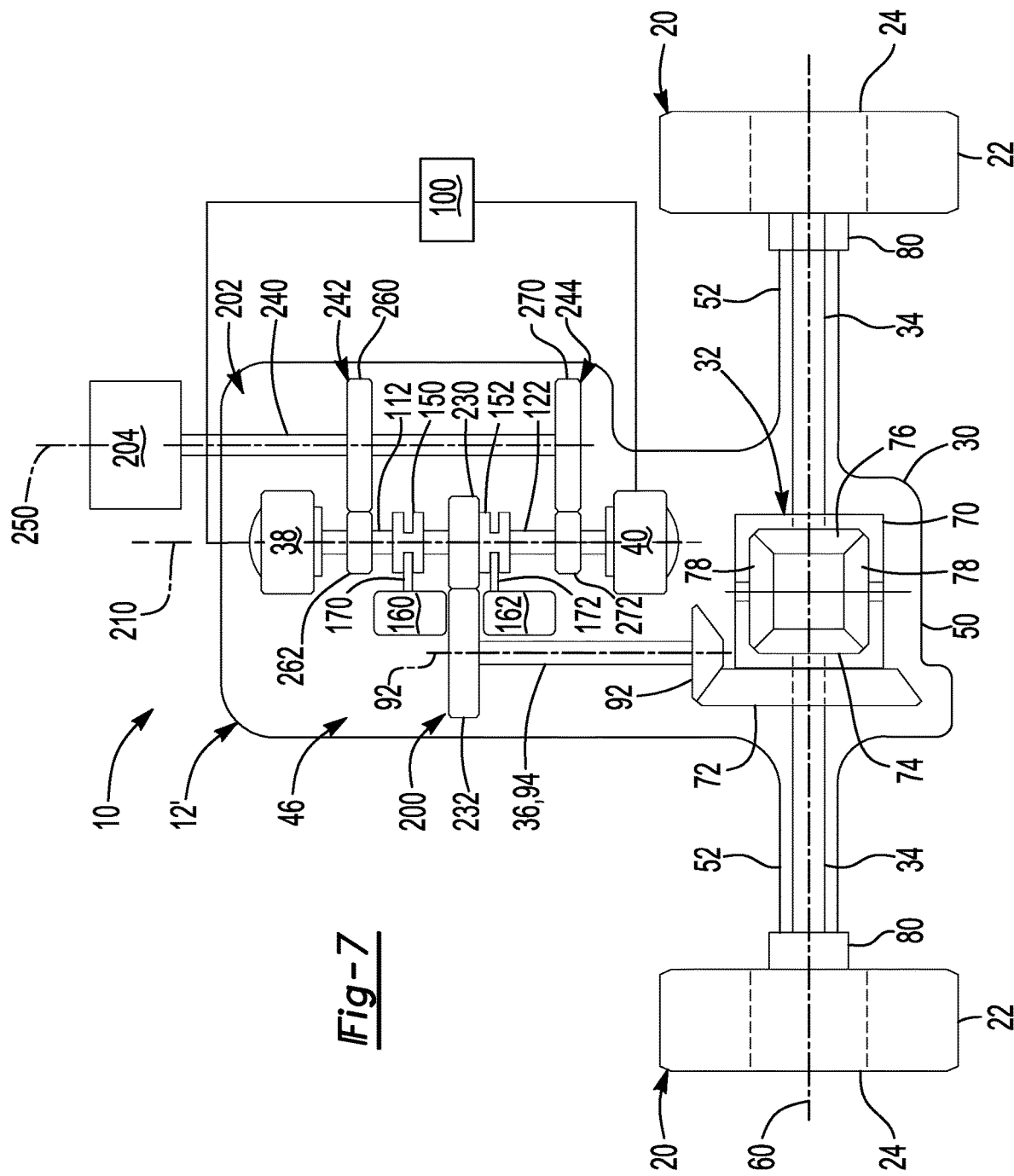
FIG. 7 depicts the drive axle system of FIG. 5 with the first clutch in the first position and the second clutch in a second position.

Referring to FIG. 7, the first clutch 150 is shown in the first position and the second clutch 152 is shown in a second position. The second clutch 152 may be moved to the second position by the second actuator 162. In the second position, the second clutch 152 may couple the second motor shaft 122 to the first gear 230 such that the first gear 230 is rotatable about the motor axis 210 with the second motor shaft 122. Accordingly, torque may be transmitted to or from the drive pinion 36 via the second gear 232, the first gear 230, and the second clutch 152. The first gear 230 is not coupled to the first motor shaft 112 by the first clutch 150. Thus, torque may not be transmitted via the gear set 200 between the drive pinion 36 and the first electric motor 38 or between the second electric motor 40 and the auxiliary gear mechanism 202 as previously discussed.

Figure 8:
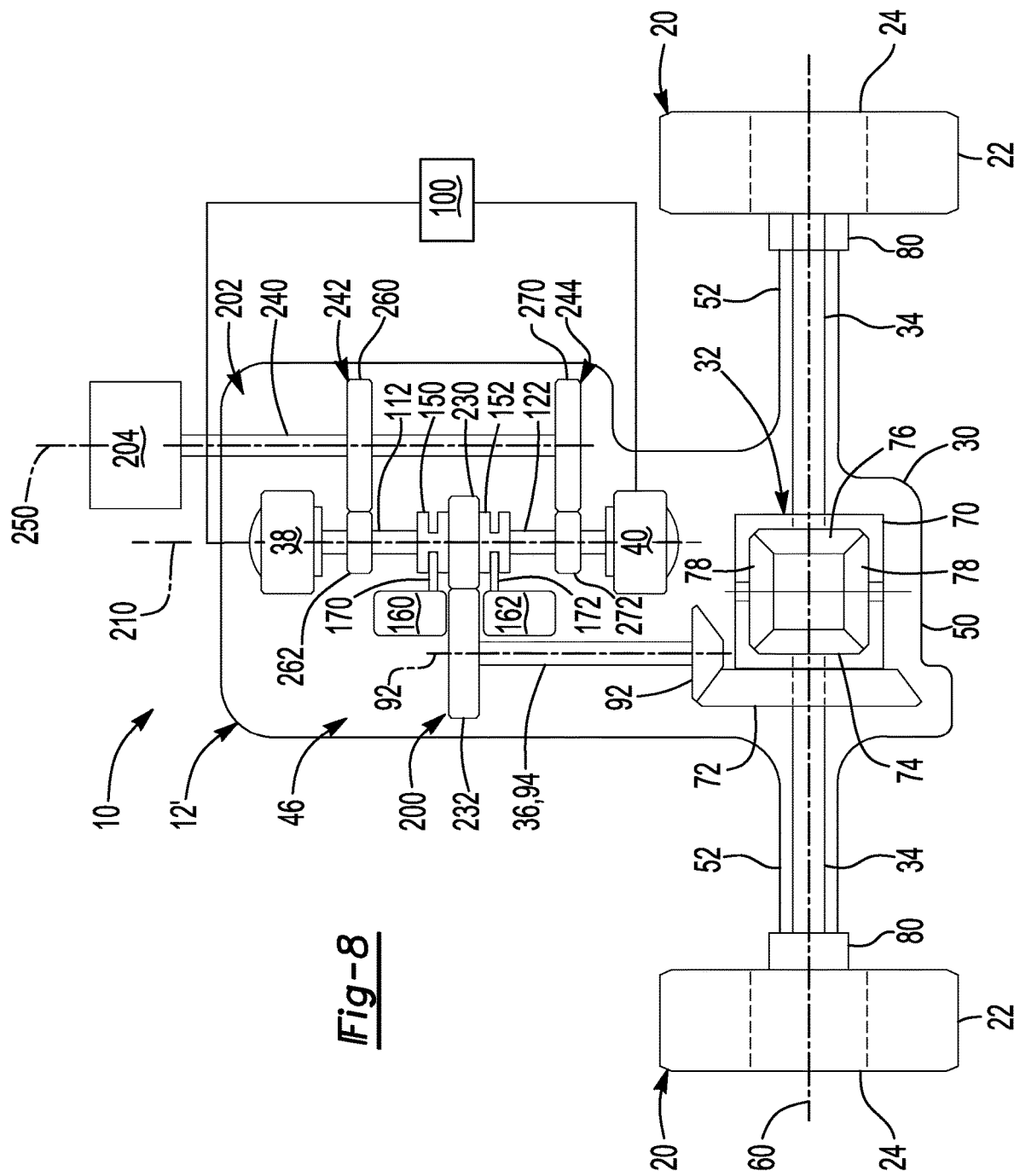
FIG. 8 depicts the drive axle system of FIG. 5 with the first clutch in the second position and the second clutch in the second position.

Referring to FIG. 8, the first clutch 150 and the second clutch 152 are shown in their respective second positions. As such, the first clutch 150 may couple the first motor shaft 112 to the first gear 230 and the second clutch 152 may couple the second motor shaft 122 to the first gear 230 such that the first gear 230 is rotatable about the motor axis 210 with the first motor shaft 112 and the second motor shaft 122. Thus, torque may be transmitted between the drive pinion 36, the first electric motor 38, and the second electric motor 40 via the gear set 200. Accordingly, the first electric motor 38 and the second electric motor 40 may both provide torque to the drive pinion 36 and hence to the differential assembly 32 to propel the vehicle. Torque may not be transmitted between the first electric motor 38 and the auxiliary gear mechanism 202 and between the second electric motor 40 and the auxiliary gear mechanism 202.

Figure 9:
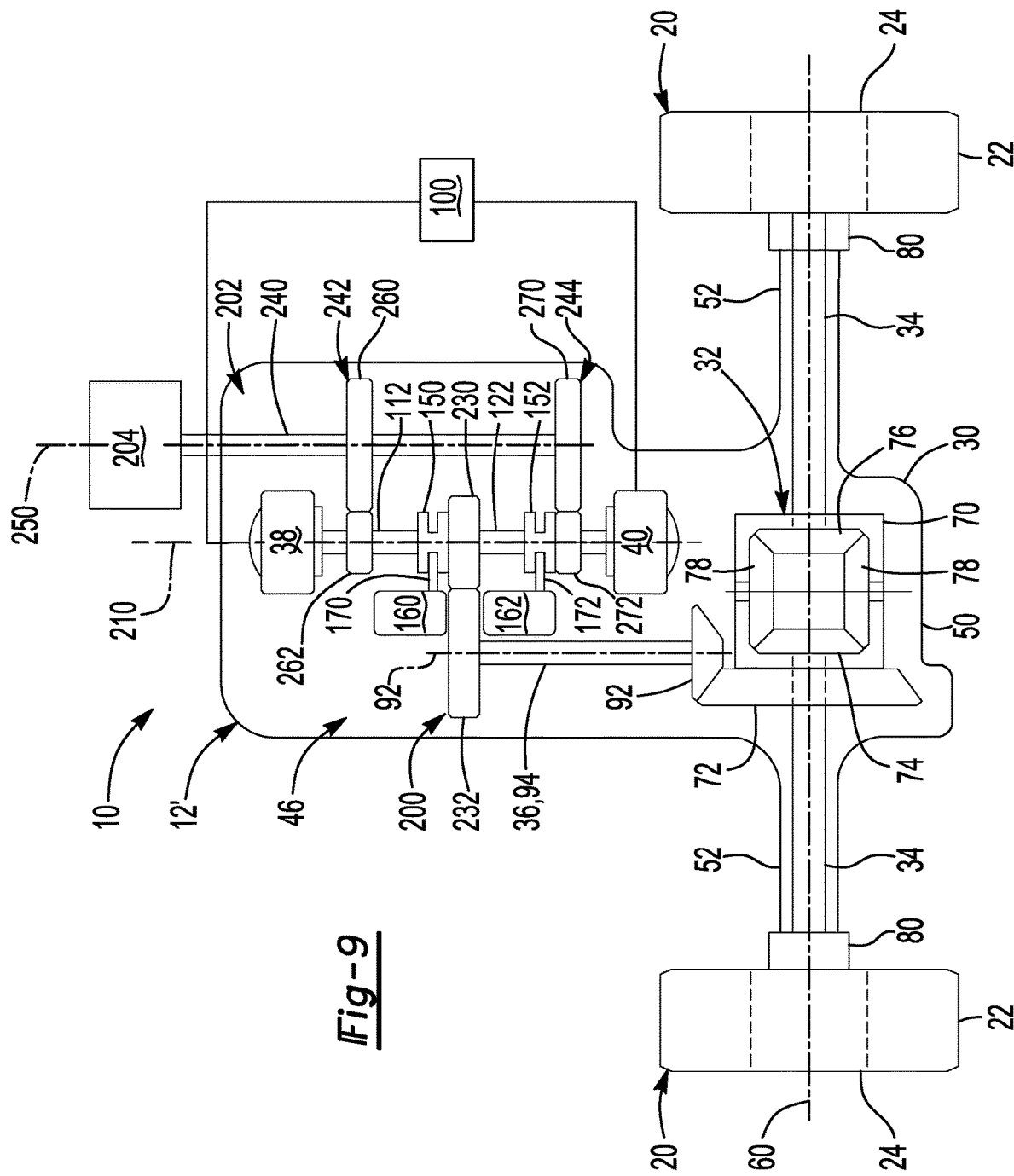
FIG. 9 depicts the drive axle system of FIG. 5 with the first clutch in the second position and the second clutch in a third position.

Referring to FIG. 9, the first clutch 150 is shown in the second position and the second clutch 152 is shown in a third position. The second clutch 152 may be moved to the third position by the second actuator 162. In the third position, the second clutch 152 may couple the fourth auxiliary gear 272 to the second motor shaft 122 such that the fourth auxiliary gear 272 may be rotatable about the motor axis 210 with the second motor shaft 122. Accordingly, torque may be transmitted to or from the auxiliary shaft 240, and hence the auxiliary device 204, via the second auxiliary gear set 244. In such a configuration, the first clutch 150 may operatively connect the first electric motor 38 to the gear set 200, and hence the first electric motor 38 is operatively connected to the differential assembly 32 and may provide torque to or receive torque from the differential assembly 32, while the second electric motor 40 may be operatively connected to the auxiliary gear mechanism 202 and the auxiliary device 204.

Figure 10:
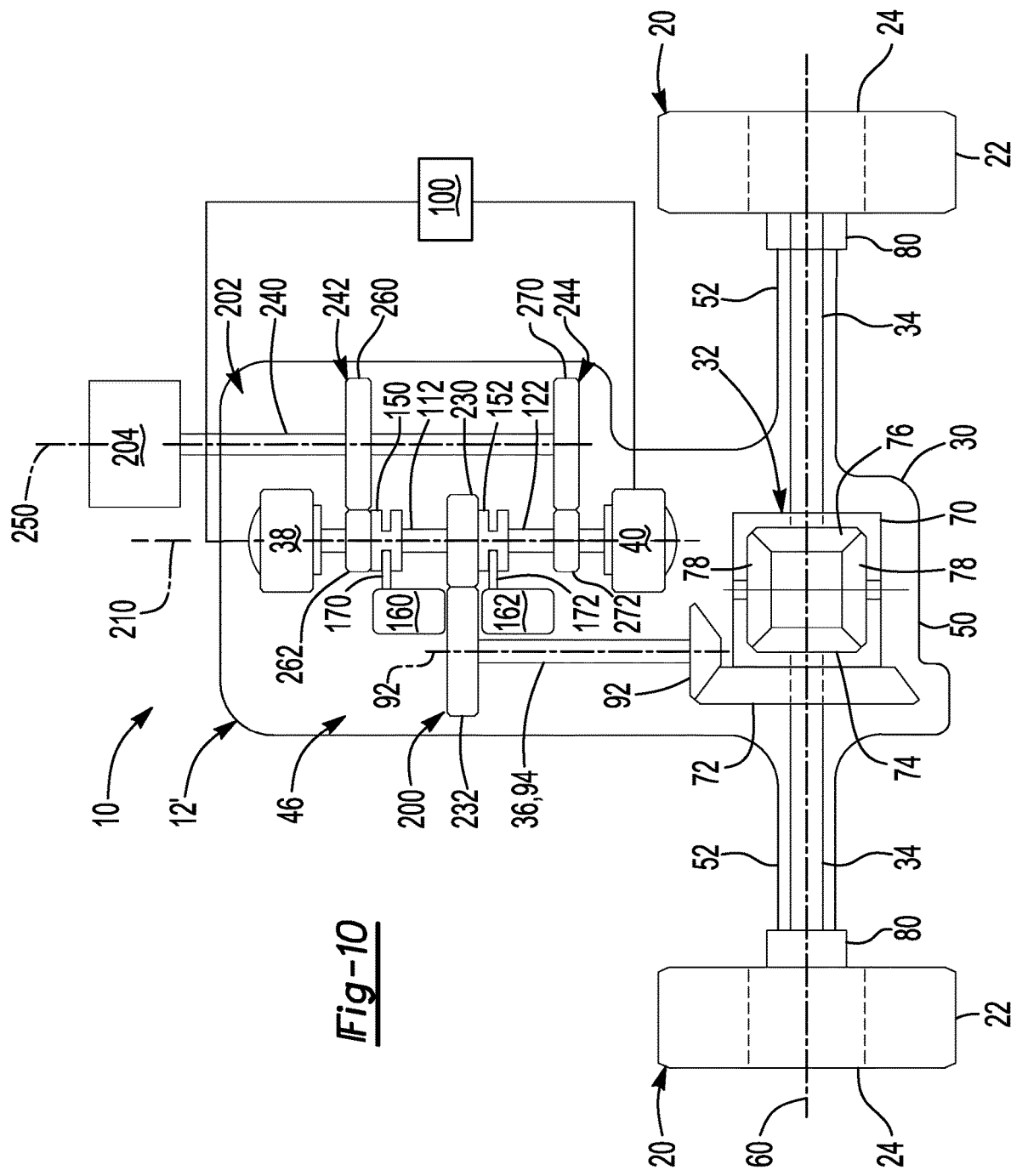
FIG. 10 depicts the drive axle system of FIG. 5 with the first clutch in the third position and the second clutch in the second position.

Referring to FIG. 10, the first clutch 150 is shown in a third position and the second clutch 152 is shown in the second position. The first clutch 150 may be moved to the third position by the first actuator 160. In the third position, the first clutch 150 may couple the second auxiliary gear 262 to the first motor shaft 112 such that the second auxiliary gear 262 may be rotatable about the motor axis 210 with the first motor shaft 112. Accordingly, torque may be transmitted to or from the auxiliary shaft 240 via the first auxiliary gear set 242. In such a configuration, the second electric motor 40 may be operatively connected to the differential assembly 32 and may provide torque to or receive torque from the differential assembly 32 while the first electric motor 38 may be operatively connected to the auxiliary gear mechanism 202 and the auxiliary device 204.

Figure 11:
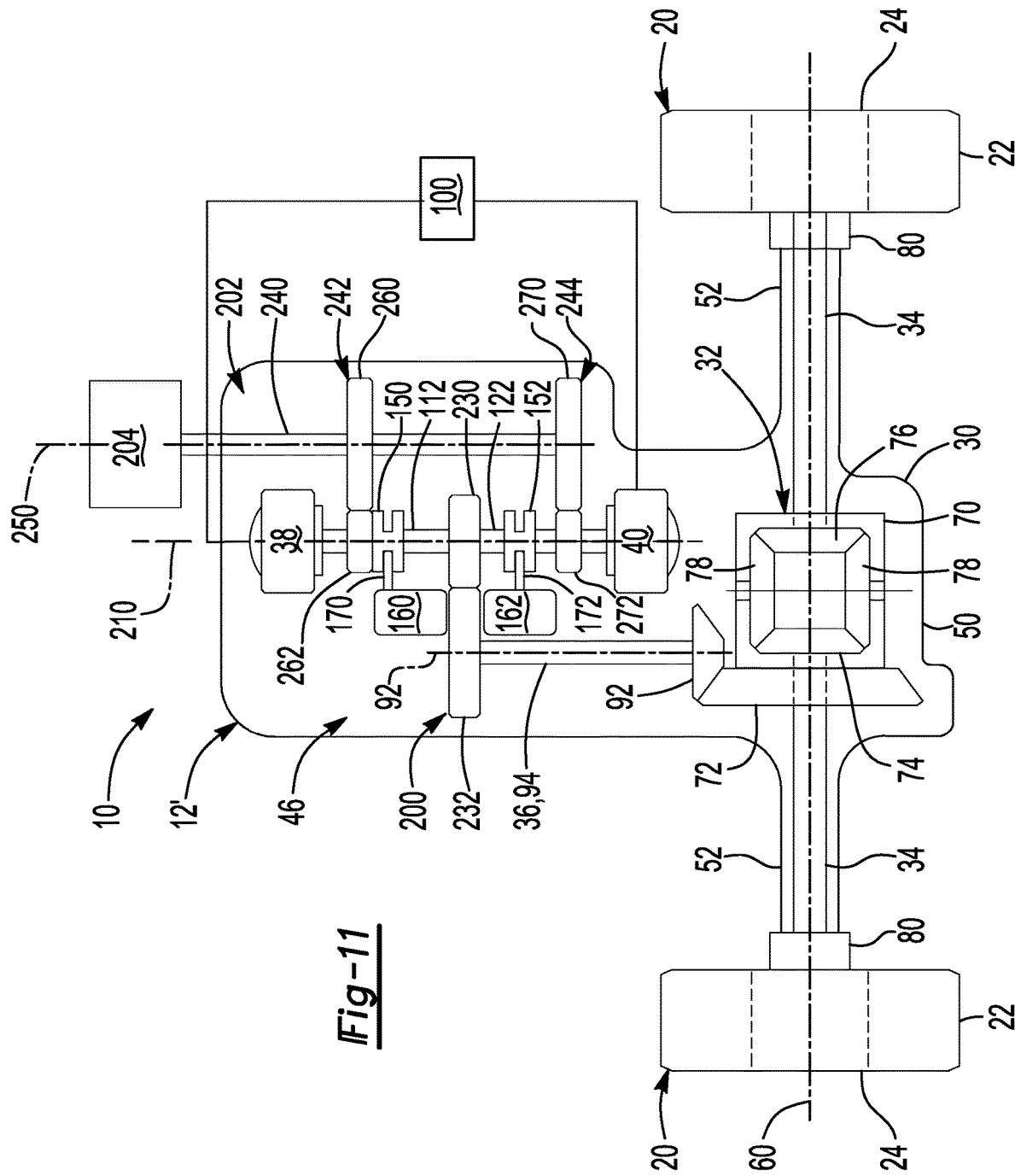
FIG. 11 depicts the drive axle system of FIG. 5 with the first clutch in the third position and the second clutch in the first position.

Referring to FIG. 11, the first clutch 150 is shown in the third position and the second clutch 152 is shown in the first position. In such a configuration, the first electric motor 38 may be operatively connected to the auxiliary device 204 via the first auxiliary gear set 242 while the second electric motor 40 may be disconnected from the drive pinion 36 and the auxiliary device 204. Such positioning may allow the first electric motor 38 to provide torque to or receive torque from the auxiliary device 204. In addition, torque may not be provided to the differential assembly 32 and axle shafts 34 to propel the vehicle. For instance, such positioning may facilitate operation of the auxiliary device 204 while the vehicle is stationary.

Figure 12:
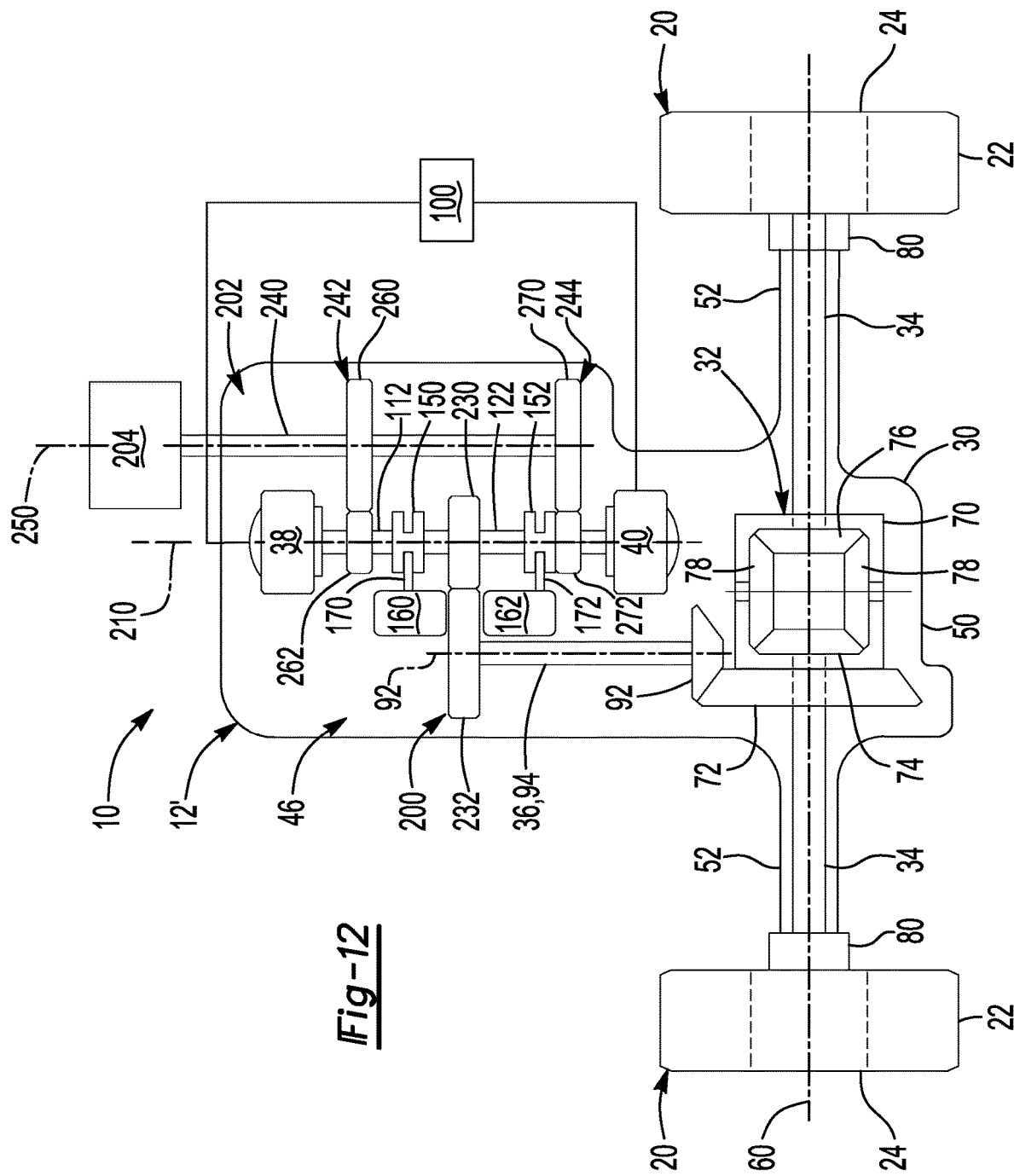
FIG. 12 depicts the drive axle system of FIG. 5 with the first clutch in the first position and the second clutch in the third position.

Referring to FIG. 12, the first clutch 150 is shown in the first position and the second clutch 152 is shown in the third position. In such a configuration, the second electric motor 40 may be operatively connected to the auxiliary device 204 via the second auxiliary gear set 244 while the first electric motor 38 may be disconnected from the drive pinion 36 and the auxiliary device 204. Such positioning may allow the second electric motor 40 to provide torque to or receive torque from the auxiliary device 204. In addition, torque may not be provided to the differential assembly 32 and axle shafts 34 to propel the vehicle. For instance, such positioning may facilitate operation of the auxiliary device 204 while the vehicle is stationary.

It is also contemplated that the first electric motor 38 and the second electric motor 40 may both provide or receive torque from the auxiliary device 204, in which case the first electric motor 38 and the second electric motor 40 may not provide torque to propel the vehicle by moving the first clutch 150 and the second clutch 152 to their respective third positions.

Figure 13:
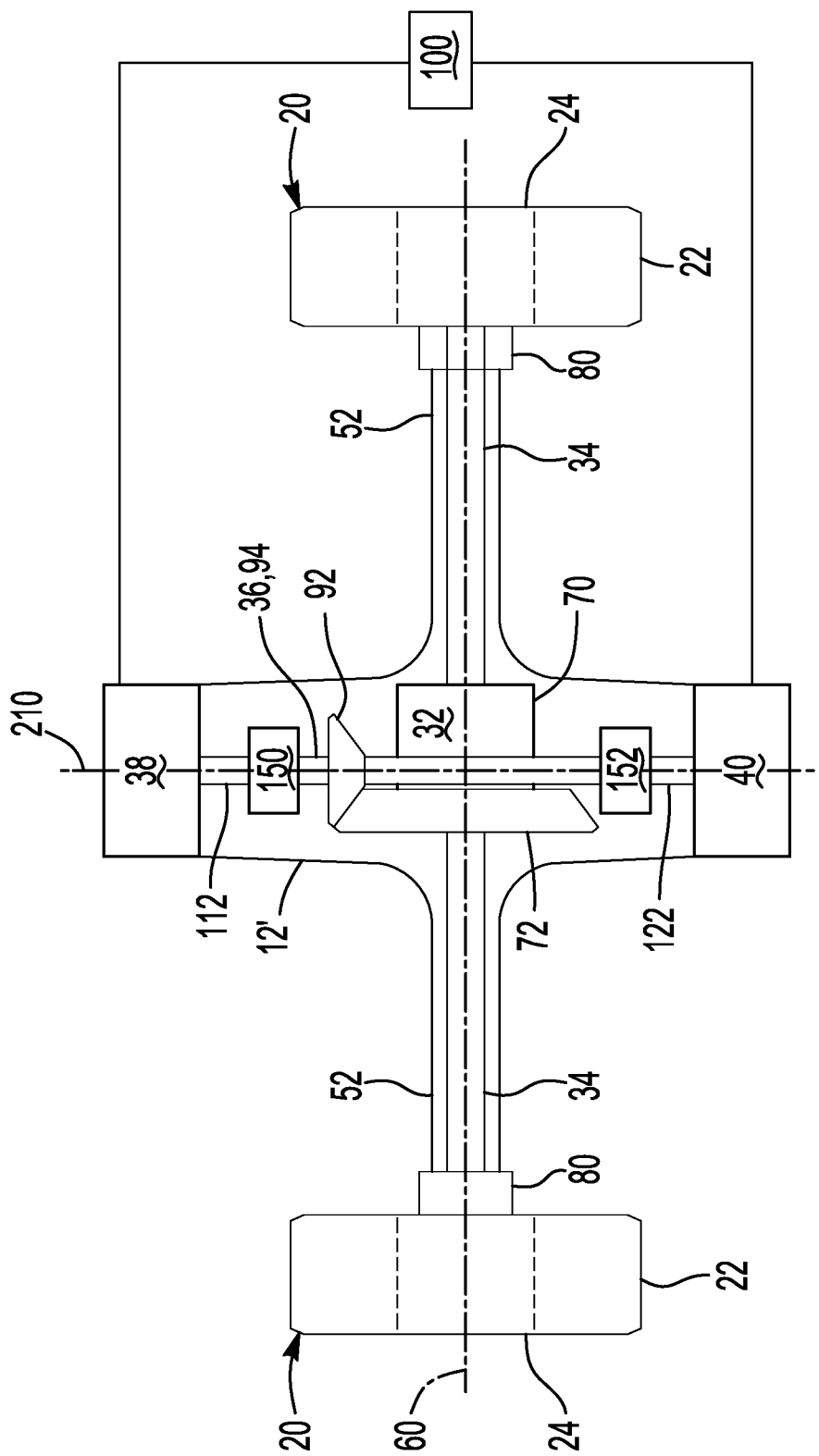
FIG. 13 depicts a drive axle system in which first and second electric motors are disposed on opposite sides of a differential assembly.

Referring to FIG. 13, an example of a drive axle system is shown in which the first electric motor 38 and the second electric motor 40 may be positioned on opposite sides of the differential assembly 32 and the first axis 60. This configuration may be similar to the configuration shown in FIG. 5 but is depicted without an auxiliary gear mechanism. The first electric motor 38 and the second electric motor 40 may be selectively coupled to the drive pinion 36 via a first clutch 150 and a second clutch 152, respectively. Optionally, one or more gear sets may operatively connect the first electric motor 38 and the second electric motor 40 to the drive pinion 36 as was previously described with respect to the configurations shown in FIGS. 1-12. The configuration in FIG. 13 may allow the electric motors to be mounted to existing differential carrier and/or axle housing designs. In addition, such a configuration may help locate the center of mass of the drive axle system near the longitudinal center of the drive axle system or approximately midway between the wheel assemblies 20. As such, the differential assembly 32, first electric motor 38, and the second electric motor 40 may be located away from the wheel assemblies 20, thereby reducing the amount of mass at the wheel ends that would need to be movably supported by a suspension system, which may reduce the cost and weight of the suspension system. In addition, positioning the electric motors on opposite sides of the differential assembly 32 and the first axis 60 may help longitudinally position the center of mass near the first axis 60, which may help balance the drive axle system in a longitudinal direction.

Figure 14:
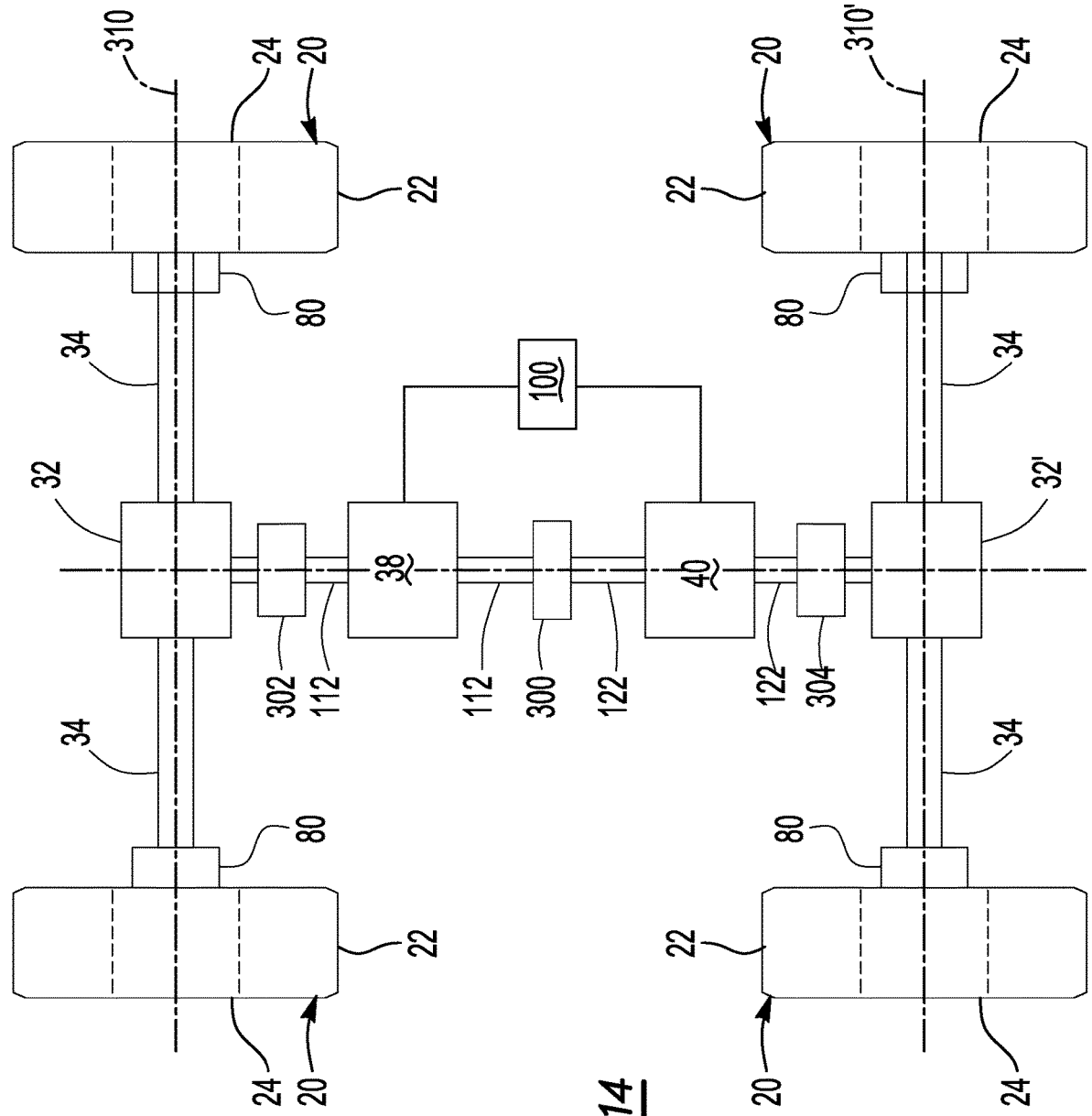
FIG. 14 depicts a drive axle system having first and second electric motors that are connectable in series.

Referring to FIG. 14, another example of a drive axle system is shown. In this configuration, the drive axle system may include two differential assemblies in addition to the first electric motor 38 and the second electric motor 40. The first differential assembly 32 may be associated with a first pair of axle shafts 34 and may be rotatable about a first differential axis 310. The second differential assembly 32' may be associated with another pair of axle shafts 34 and may be rotatable about a second differential axis 310' that may differ from the first differential axis 310.

The first electric motor 38 and the second electric motor 40 may be disposed in series with each other and may be operatively connectable to the first differential assembly 32, the second differential assembly 32', or both. For instance, a clutch 300 may be disposed between the first electric motor 38 and the second electric motor 40. Optionally, a second clutch 302, and/or a third clutch 304 may be provided. The second clutch 302 may be positioned between the first electric motor 38 and the first differential assembly 32. The third clutch 304 may be positioned between the second electric motor 40 and the second differential assembly 32'.

The first electric motor 38 may be operatively connected to the first differential assembly 32 but not the second differential assembly 32' when the clutch 300 decouples the first electric motor 38 from the second electric motor 40 and the second clutch 302 couples the first electric motor 38 to the first differential assembly 32. Similarly, the second electric motor 40 may be operatively connected to the second differential assembly 32' but not the first differential assembly 32 when the clutch 300 decouples the first electric motor 38 from the second electric motor 40 and the third clutch 304 couples the second electric motor 40 to the second differential assembly 32'.

The first electric motor 38 and the second electric motor 40 may be operatively connected to and may provide torque to the first differential assembly 32 but not the second differential assembly 32' when the clutch 300 couples the first electric motor 38 and the second electric motor 40, the second clutch 302 couples the first electric motor 38 and the first differential assembly 32, and the third clutch 304 decouples the second electric motor 40 from the second differential assembly 32'.

The first electric motor 38 and the second electric motor 40 may be operatively connected to and may provide torque to the second differential assembly 32' but not the first differential assembly 32 when the clutch 300 couples the first electric motor 38 and the second electric motor 40, the third clutch 304 couples the second electric motor 40 and the second differential assembly 32', and the second clutch 302 decouples the first electric motor 38 from the first differential assembly 32.

The first electric motor 38 and the second electric motor 40 may be operatively connected to or may provide torque to the first differential assembly 32 and the second differential assembly 32' when the clutch 300, the second clutch 302, and the third clutch 304, are all engaged.

The configurations described above may allow a drive axle system to be provided with different electric motors that may be selectively operated or selectively operatively connected. An electric motor may be selected for operation based on its operating efficiency as previously described. In addition, the electric motors may be operated at different rotational speeds to provide a desired amount of torque or to vary the amount of torque that is provided. Such a configuration may allow a particular amount of torque to be provided at different electric motor rotational speeds while maintaining a desired level of electric motor operating efficiency, which may allow a drive axle system to accommodate different wheel and tire diameters (which may affect rotational speeds upstream components such as the axle shafts, differential assembly, and drive pinion) with a standardized set of electric motors and/or standardized gearing, which may help reduce cost and complexity.

A drive axle system configuration may allow one or more electric motors to provide torque to an auxiliary device when torque is provided to the vehicle wheels or when torque is not provided to the vehicle wheels. The electric motor or motors may also be selected that may provide greater performance efficiency may be selected for connection to the auxiliary device.

It is also contemplated that when one electric motor is operated and connected to provide torque that the disconnected electric motor could also be operated to reduce the "magnetic viscosity" effect of back EMF, or the counter-electromotive force that may oppose driving of the connected electric motor. It is also contemplated that one or more electric motors may act as a generator and facilitate regenerative braking in which an electric motor may recover energy during braking and act as a generator that may charge an electrical power source.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
    a first differential assembly that is rotatable about a first differential axis;
    a second differential assembly that is rotatable about a second differential axis;
    a first electric motor that is operatively connectable to the first differential assembly; and
    a second electric motor that is operatively connectable to the second differential assembly, wherein the first electric motor and the second electric motor are operatively connectable in series with a clutch, wherein the first electric motor comprises a first motor shaft that extends along a motor axis and extends through the first electric motor from the clutch to a second clutch.

2. The drive axle system of claim 1 wherein the first electric motor and the second electric motor are rotatable the motor axis.

3. The drive axle system of claim 2 wherein the clutch is disposed along the motor axis between the first electric motor and the second electric motor.

4. The drive axle system of claim 1 wherein the second clutch selectively couples the first electric motor to the first differential assembly.

5. The drive axle system of claim 4 wherein the first electric motor and the second electric motor are rotatable about the motor axis, and the second clutch is disposed along the motor axis between the first electric motor and the first differential assembly.

6. The drive axle system of claim 1 further comprising a third clutch that selectively couples the second electric motor to the second differential assembly.

7. The drive axle system of claim 6 wherein the first electric motor and the second electric motor are rotatable about the motor axis, and the third clutch is disposed along the motor axis between the second electric motor and the second differential assembly.

8. The drive axle system of claim 1 wherein the first electric motor and the second electric motor are operable at a same efficiency at different rotational speeds.

9. A drive axle system comprising:
    a first differential assembly that is rotatable about a first differential axis;
    a second differential assembly that is rotatable about a second differential axis;
    a first electric motor that is operatively connectable to the first differential assembly;
    a second electric motor that is operatively connectable to the second differential assembly, wherein the first electric motor and the second electric motor are operatively connectable in series with a clutch and wherein the first electric motor and the second electric motor are rotatable about a motor axis;
    a second clutch that selectively couples the first electric motor to the first differential assembly; and
    a third clutch that selectively couples the second electric motor to the second differential assembly, wherein the clutch, the second clutch, and the third clutch are disposed along the motor axis, the clutch is positioned between the first electric motor and the second electric motor, the second clutch is positioned between the first electric motor and the first differential assembly, the third clutch is positioned between the second electric motor and the second differential assembly, a first motor shaft extends through the first electric motor from the clutch to the second clutch and a second motor shaft extends through the second electric motor from the clutch to the third clutch.

10. The drive axle system of claim 9 wherein the second clutch is directly coupled to the first differential assembly with a shaft.

11. The drive axle system of claim 9 wherein the third clutch is directly coupled to the second differential assembly with a shaft.

12. The drive axle system of claim 9 wherein the second clutch is directly coupled to the first differential assembly with a shaft and the third clutch is directly coupled to the second differential assembly with another shaft.

13. The drive axle system of claim 9 wherein first electric motor and the second electric motor are operatively connected to the first differential assembly but not to the second differential assembly when the clutch couples the first electric motor and the second electric motor, the second clutch couples the first electric motor and the first differential assembly, and the third clutch decouples the second electric motor from the second differential assembly.

14. The drive axle system of claim 9 wherein first electric motor and the second electric motor provide torque to the first differential assembly but not to the second differential assembly when the clutch couples the first electric motor and the second electric motor, the second clutch couples the first electric motor and the first differential assembly, and the third clutch decouples the second electric motor from the second differential assembly.

15. The drive axle system of claim 9 wherein the first electric motor and the second electric motor are operatively connected to the second differential assembly but not to the first differential assembly when the clutch couples the first electric motor and the second electric motor, the third clutch couples the second electric motor and the second differential assembly, and the second clutch decouples the first electric motor from the first differential assembly.

16. The drive axle system of claim 9 wherein the first electric motor and the second electric motor provide torque to the second differential assembly but not to the first differential assembly when the clutch couples the first electric motor and the second electric motor, the third clutch couples the second electric motor and the second differential assembly, and the second clutch decouples the first electric motor from the first differential assembly.

17. The drive axle system of claim 9 wherein the first electric motor and the second electric motor are operatively connected to the first differential assembly and the second differential assembly when the clutch, the second clutch, and the third clutch are engaged.

18. The drive axle system of claim 9 wherein the first electric motor and the second electric motor provide torque to the first differential assembly and the second differential assembly when the clutch, the second clutch, and the third clutch are engaged.

19. The drive axle system of claim 1 wherein the second differential axis differs from the first differential axis and is disposed parallel to the first differential axis.

20. The drive axle system of claim 2 wherein the first differential assembly and the second differential assembly are disposed along the motor axis.

* * * * *